(12) United States Patent
Matsubayashi et al.

(10) Patent No.: US 8,918,438 B2
(45) Date of Patent: Dec. 23, 2014

(54) MANAGEMENT SYSTEM, MANAGEMENT APPARATUS, AND MANAGEMENT METHOD FOR ELECTRONIC DEVICE

(71) Applicant: Fujitsu Limited, Kawasaki (JP)

(72) Inventors: Hirokazu Matsubayashi, Kawasaki (JP); Shoji Oshima, Kawasaki (JP); Tatsuhiko Machida, Kawasaki (JP); Yukari Tsuchiyama, Kawasaki (JP); Satoshi Yazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 13/685,788

(22) Filed: Nov. 27, 2012

(65) Prior Publication Data

US 2013/0159332 A1    Jun. 20, 2013

(30) Foreign Application Priority Data

Dec. 15, 2011   (JP) ................. 2011-274066

(51) Int. Cl.
  *G06F 17/30* (2006.01)
  *G06F 3/06* (2006.01)
(52) U.S. Cl.
  CPC ........ *G06F 17/30964* (2013.01); *G06F 3/0605* (2013.01); *G06F 3/0632* (2013.01); *G06F 3/0689* (2013.01)
  USPC ........................................................ 707/823
(58) Field of Classification Search
  CPC ............ G06F 17/30073; G06F 17/302; G06F 17/30197
  See application file for complete search history.

(56) References Cited

U.S. PATENT DOCUMENTS

| 5,751,936 | A | * | 5/1998 | Larson et al. | ................ | 714/6.32 |
| 6,092,169 | A | * | 7/2000 | Murthy et al. | ................ | 711/170 |
| 8,131,919 | B1 | * | 3/2012 | Gasser et al. | ................ | 711/112 |
| 2001/0049800 | A1 | * | 12/2001 | Suzuki et al. | .................... | 714/7 |

FOREIGN PATENT DOCUMENTS

JP   11-085412    3/1999
JP   2001-100946   4/2001

* cited by examiner

*Primary Examiner* — Khanh Pham
(74) *Attorney, Agent, or Firm* — Fujitsu Patent Center

(57) ABSTRACT

A collection unit collects attribute information of each of a plurality of electronic devices, and registers the collected attribute information in mounted device information correspondingly to a mounting position of the electronic device in a management system. A determination unit refers to device definition information in which attribute information of each electronic device mounted on the management system is registered correspondingly to a mounting position, determines as a comparison object position a mounting position in which the attribute information registered in the mounted device information is not matched with the attribute information registered in the device definition information and, when a plurality of comparison object positions are present, determines whether the attribute information of the mounted device information corresponding to one comparison object position is matched with the attribute information of the device definition information corresponding to another comparison object position.

17 Claims, 24 Drawing Sheets

232 DE TABLE

| DE SLOT | #00 | #01 | #02 | ... | #38 | #39 |
|---|---|---|---|---|---|---|
| DETERMINATION RESULT | | | | ... | | |

233 DISK DEFINITION TABLE (DE#00)

| DISK SLOT | #00 | #01 | #02 | #03 | ... | #22 | #23 |
|---|---|---|---|---|---|---|---|
| DISK TYPE | SAS | SAS | SAS | SAS | ... | SSD | SSD |
| DISK CAPACITY | 300 | 300 | 300 | 300 | ... | 146 | 146 |
| DETERMINATION RESULT | | | | | ... | | |

234 DISK MOUNT TABLE (DE#00)

| DISK SLOT | #00 | #01 | #02 | #03 | ... | #22 | #23 |
|---|---|---|---|---|---|---|---|
| DISK TYPE | SAS | SAS | SAS | SAS | ... | SSD | SSD |
| DISK CAPACITY | 450 | 450 | 450 | 300 | ... | 146 | 146 |
| DETERMINATION RESULT | | | | | ... | | |

FIG. 9

EXAMPLE IN WHICH DE IS MOUNTED ON ERRONEOUS POSITION

| DE SLOT | #00 | #01 | ... | #10 | #11 | #12 | ... |
|---|---|---|---|---|---|---|---|
| DETERMINA-TION RESULT | #11 | OK | ... | #00 | #10 | OK | ... |

FIG. 14A    232 DE TABLE

EXAMPLE OF CASE WHERE THE NUMBER OF DE SLOTS OF "ERROR" IS SMALLER THAN OR EQUAL TO THRESHOLD

| DE SLOT | #00 | #01 | #02 | #03 | #04 | #05 | #06 | #07 | ... |
|---|---|---|---|---|---|---|---|---|---|
| DETERMINA-TION RESULT | OK | OK | ERROR | OK | ERROR | OK | OK | OK | ... |

FIG. 14B    232 DE TABLE

EXAMPLE OF CASE WHERE THE NUMBER OF DE SLOTS OF "ERROR" IS GREATER THAN THRESHOLD

| DE SLOT | #00 | #01 | #02 | #03 | #04 | #05 | #06 | #07 | ... |
|---|---|---|---|---|---|---|---|---|---|
| DETERMINA-TION RESULT | OK | ERROR | ERROR | OK | ERROR | ERROR | ERROR | ERROR | ... |

FIG. 14C    232 DE TABLE

233 DISK DEFINITION TABLE (DE#10)

| DISK SLOT | #00 | #01 | #02 | #03 | #04 | #05 | #06 | #07 | #08 | #09 | #10 | #11 | #12 | #13 | ... |
|---|---|---|---|---|---|---|---|---|---|---|---|---|---|---|---|
| DISK TYPE | SAS | SAS | SAS | SAS | | SSD | SSD | SSD | SSD | | SAS | SAS | SAS | SAS | ... |
| DISK CAPACITY | 300 | 300 | 300 | 300 | | 146 | 146 | 146 | 146 | | 450 | 600 | 450 | 600 | ... |
| DETERMINATION | OK | OK | OK | OK | 10-04 ERROR | OK | OK | OK | OK | OK | 20-10 | 20-11 | 20-12 | 20-13 | ... |

(DE#10)

| DISK SLOT | #00 | #01 | #02 | #03 | #04 | #05 | #06 | #07 | #08 | #09 | #10 | #11 | #12 | #13 | ... |
|---|---|---|---|---|---|---|---|---|---|---|---|---|---|---|---|
| DISK TYPE | SAS | SAS | SSD | SAS | SAS | SSD | SSD | SSD | SAS | | | | | | ... |
| DISK CAPACITY | 300 | 300 | 300 | 600 | 300 | 146 | 146 | 146 | 146 | | | | | | ... |
| DETERMINATION | OK | OK | | | MOVE | | | | | OK | | | | | ... |

234 DISK MOUNT TABLE (DE#20)

| DISK SLOT | #00 | #01 | #02 | #03 | #04 | #05 | #06 | #07 | #08 | #09 | #10 | #11 | #12 | #13 | ... |
|---|---|---|---|---|---|---|---|---|---|---|---|---|---|---|---|
| DISK TYPE | SAS | SAS | SAS | SAS | SAS | SAS | SSD | SSD | SSD | | SAS | SAS | SAS | SAS | ... |
| DISK CAPACITY | 146 | 146 | 146 | 600 | 600 | 600 | 146 | 300 | 300 | | 450 | 600 | 450 | 600 | ... |
| DETERMINATION | | | | OK | OK | OK | OK | OK | OK | OK | MOVE | MOVE | MOVE | MOVE | ... |

FIG. 16

234 DISK MOUNT TABLE (DE#10)

| DISK SLOT | #00 | #01 | #02 | #03 | #04 | #05 | #06 | #07 | #08 | #09 | #10 | #11 | #12 | #13 | ... |
|---|---|---|---|---|---|---|---|---|---|---|---|---|---|---|---|
| DISK TYPE | SAS | SAS | SSD | | SAS | SSD | SSD | SSD | SAS | | | | | | ... |
| DISK CAPACITY | 300 | 300 | 300 | | 300 | 146 | 146 | 146 | 146 | | | | | | ... |
| DETERMINATION | OK | OK | ERROR | | MOVE | OK | OK | OK | OK | OK | | | | | ... |

(DE#20)

| DISK SLOT | #00 | #01 | #02 | #03 | #04 | #05 | #06 | #07 | #08 | #09 | #10 | #11 | #12 | #13 | ... |
|---|---|---|---|---|---|---|---|---|---|---|---|---|---|---|---|
| DISK TYPE | SAS | SAS | SAS | SAS | SAS | SAS | | SSD | SSD | | SAS | SAS | SAS | SAS | ... |
| DISK CAPACITY | 146 | 146 | 146 | 600 | 600 | 600 | | 300 | 300 | | 450 | 600 | 450 | 600 | ... |
| DETERMINATION | ERROR | ERROR | ERROR | OK | OK | OK | | OK | OK | OK | MOVE | MOVE | MOVE | MOVE | ... |

FIG. 17

MANAGEMENT SYSTEM, MANAGEMENT APPARATUS, AND MANAGEMENT METHOD FOR ELECTRONIC DEVICE

CROSS-REFERENCE TO RELATED APPLICATION

This application is based upon and claims the benefit of priority of the prior Japanese Patent Application No. 2011-274066, filed on Dec. 15, 2011, the entire contents of which are incorporated herein by reference.

FIELD

The embodiments discussed herein are related to a management system, a management apparatus, and a management method for an electronic device.

BACKGROUND

A storage system using a plurality of high-capacity storage devices such as an HDD (Hard Disk Drive) becomes widely used recently. In the storage system, in many cases, an HDD is further mounted with a form of a disk array device on which a plurality of HDDs are mounted. In a storage system of a rack mount system, for example, a plurality of disk array devices may be mounted on one or more racks, respectively.

In the above-described storage system, since expansion of storage capacity is requested, the number of mounted HDDs increases. Therefore, there arises a problem that before or after shipping, a lot of trouble is taken for work of confirming that an HDD of correct specifications is mounted on the storage system.

On the other hand, when determining whether position information of an HDD at the time of initial setting is matched with position information of the HDD on start-up, some systems determine whether a positioning system of the HDD is correct. When comparing specific information read from an exchanged HDD with specific information previously stored in a memory, other systems further detect a connection error of the HDD.

Japanese Laid-open Patent Publication No. 2001-100946
Japanese Laid-open Patent Publication No. 11-085412

However, in a process of comparing specific information of previously-set HDD and specific information of actually-mounted HDD, a system only determines whether a correct HDD matched with previous setting is mounted. Accordingly, an effect of improving efficiency of work for confirming a mounting position of the HDD is small.

Further, there arises a problem that in a system including multiple electronic devices, without being limited to a storage system, a lot of trouble is taken in work for confirming a mounting position of electronic device.

SUMMARY

According to an aspect, a management system includes a plurality of electronic devices and a management apparatus which manages the plurality of electronic devices. The management apparatus has a collection unit which collects attribute information of each of the plurality of electronic devices, and registers the collected attribute information in first device information correspondingly to a mounting position of the electronic device of the management system, and a determination unit which refers to second device information in which attribute information in which each electronic device is mounted on the management system is correspondingly registered in a mounting position, determines as a comparison object position a mounting position in which attribute information registered in the first device information is not matched with the attribute information registered in the second device information and, when a plurality of comparison object positions are present, determines whether the attribute information of the first device information according to one comparison object position is matched with the attribute information of the second device information corresponding to another comparison object position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of information registered in a DE table, a disk definition table, and a disk mount table;

FIGS. 14A, 14B, and 14C each illustrate an example of a state of a DE table based on a comparison result of attribute information in units of DE slots;

FIG. 16 illustrates a detection example of an unmatched disk slot the attribute information of which is matched with each other;

FIG. 17 illustrates a detection example of an unmatched disk slot which is registered as "ERROR";

DESCRIPTION OF EMBODIMENTS

Figure 1:
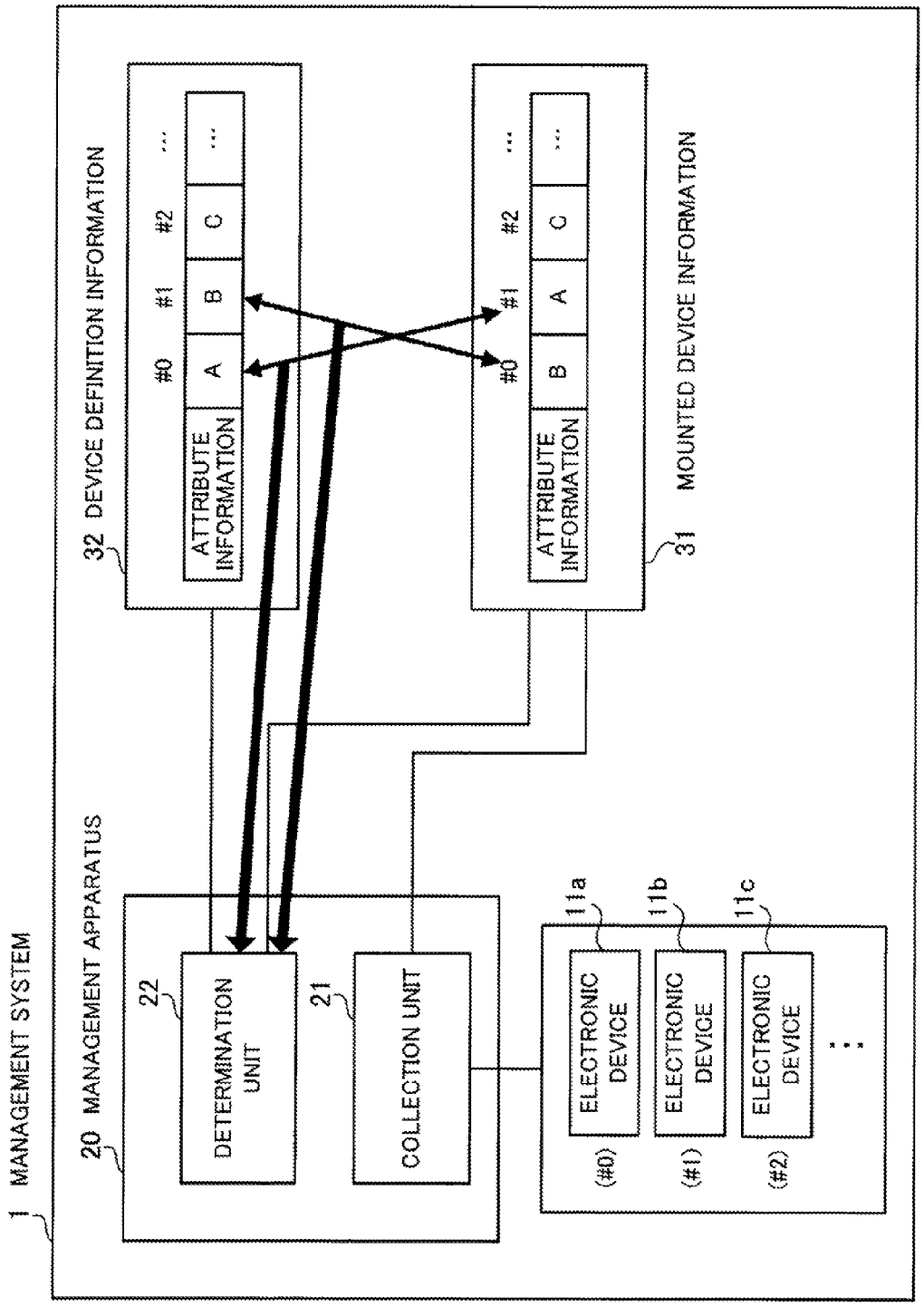
FIG. 1 illustrates a configuration example and an operation example of a management system according to a first embodiment.

Several embodiments will be described below with reference to the accompanying drawings, wherein like reference numerals refer to like elements throughout.

First Embodiment

FIG. 1 illustrates a configuration example and an operation example of a management system according to a first embodiment. The management system 1 illustrated in FIG. 1 includes a plurality of electronic devices 11a to 11c and a management apparatus 20 which is connected to these electronic devices 11a to 11c and which manages the electronic devices 11a to 11c. Note that the number of the electronic devices connected to the management apparatus 20 is not limited to an example of FIG. 1.

To each electronic device mounted on the management system 1, position information is given. In an example of FIG. 1, the electronic device 11a is mounted toward position information "#0", the electronic device 11b is mounted toward position information "#1", and the electronic device 11c is mounted toward position information "#2". The management apparatus 20 further recognizes the connected electronic devices correspondingly to the position information.

The management apparatus 20 includes a collection unit 21 and a determination unit 22. For example, a CPU (Central Processing Unit) included in the management apparatus 20 executes a predetermined program stored in a storage unit or a storage medium, thus realizing each process of the collection unit 21 and the determination unit 22.

The collection unit 21 collects attribute information of the electronic devices 11a to 11c and registers the collected attribute information in mounted device information 31 correspondingly to the position information. The mounted device information 31 is information temporarily generated by the collection unit 21, for example, is stored in a RAM (Random Access Memory) in the management apparatus 20.

The determination unit 22 refers to the mounted device information 31 and device definition information 32. In the device definition information 32, attribute information of the electronic device mounted on the management system 1 is previously defined correspondingly to the position information. Specifically, the device definition information 32 is obtained by defining attribute information of the electronic device to be mounted on the management system 1. For example, the device definition information 32 is stored in an interior or exterior nonvolatile storage device of the management apparatus 20.

The determination unit 22 determines a mounting position in which the attribute information defined in the device definition information 32 is not matched with the attribute information registered in the mounted device information 31. Here, since the determined mounting position is an object of subsequent comparison processing, it is called a "comparison object position". In an example of FIG. 1, positions corresponding to "#0" and "#1" are comparison object positions, respectively.

In the case where a plurality of comparison object positions are present, among them, the determination unit 22 compares attribute information of the device definition information 32 corresponding to one comparison object position with attribute information of the mounted device information 31 corresponding to another comparison object position. Suppose here that a combination of the comparison object positions in which both of the compared attribute information units are matched is present. In this case, when the electronic device mounted on the one comparison object position is moved to the other comparison object position, it is correctly mounted on the other comparison object position. Accordingly, when a confirmation worker recognizes comparison results of both the attribute information units, confirmation work of the mounting position becomes easy, and therefore, the work efficiency is improved.

In FIG. 1, for example, the determination unit 22 compares the attribute information of the device definition information 32 corresponding to the position information "#0" with the attribute information of the mounted device information 31 corresponding to the position information "#1". In this case, since both of the attribute information units to be compared are "A", the determination unit 22 determines that a correct mounting position of the electronic device 11b mounted on a position "#1" is a position "#0", and outputs notification information indicating the above effect.

When recognizing the output notification information, for example, through the display device, a confirmation worker freshly mounts the electronic device 11b on a position #0 from a position #1. In this case, toward a position #0 on which the electronic device 11a is erroneously mounted, the confirmation worker need not freshly carry a correct electronic device from another place for mounting, and as a result, the work efficiency is improved.

In an example of FIG. 1, the attribute information "B" of the device definition information 32 corresponding to the position information "#1" is matched with the attribute information "A" of the mounted device information 31 corresponding to the position information "#0". Accordingly, based on a comparison result between the attribute information of the device definition information 32 corresponding to the position information "#0" and the attribute information of the mounted device information 31 corresponding to the position information "#1" as well as a comparison result between the attribute information of the device definition information 32 corresponding to the position information "#1" and the attribute information of the mounted device information 31 corresponding to the position information "#0", the confirmation worker recognizes that the electronic device 11a mounted on the position #0 is preferably replaced with the electronic device 11b mounted on the position #1.

According to the above-described management apparatus 20, since an electronic device to change a mounting position and a position of its change destination are determined, efficiency of confirmation work in a mounting position of an electronic device is improved. The above-described effect is particularly effective in the case of performing confirmation work on a job site for installing the management system 1. Further, on a job site for installing the management system 1, a confirmation worker is able to easily confirm an electronic device to change a mounting position, so that confirmation work before shipping the management system 1 may be omitted and a working process before the shipping may be simplified.

Second Embodiment

Next, a system using a storage device such as an HDD and an SSD (Solid State Drive) will be described as an electronic device.

Figure 2:
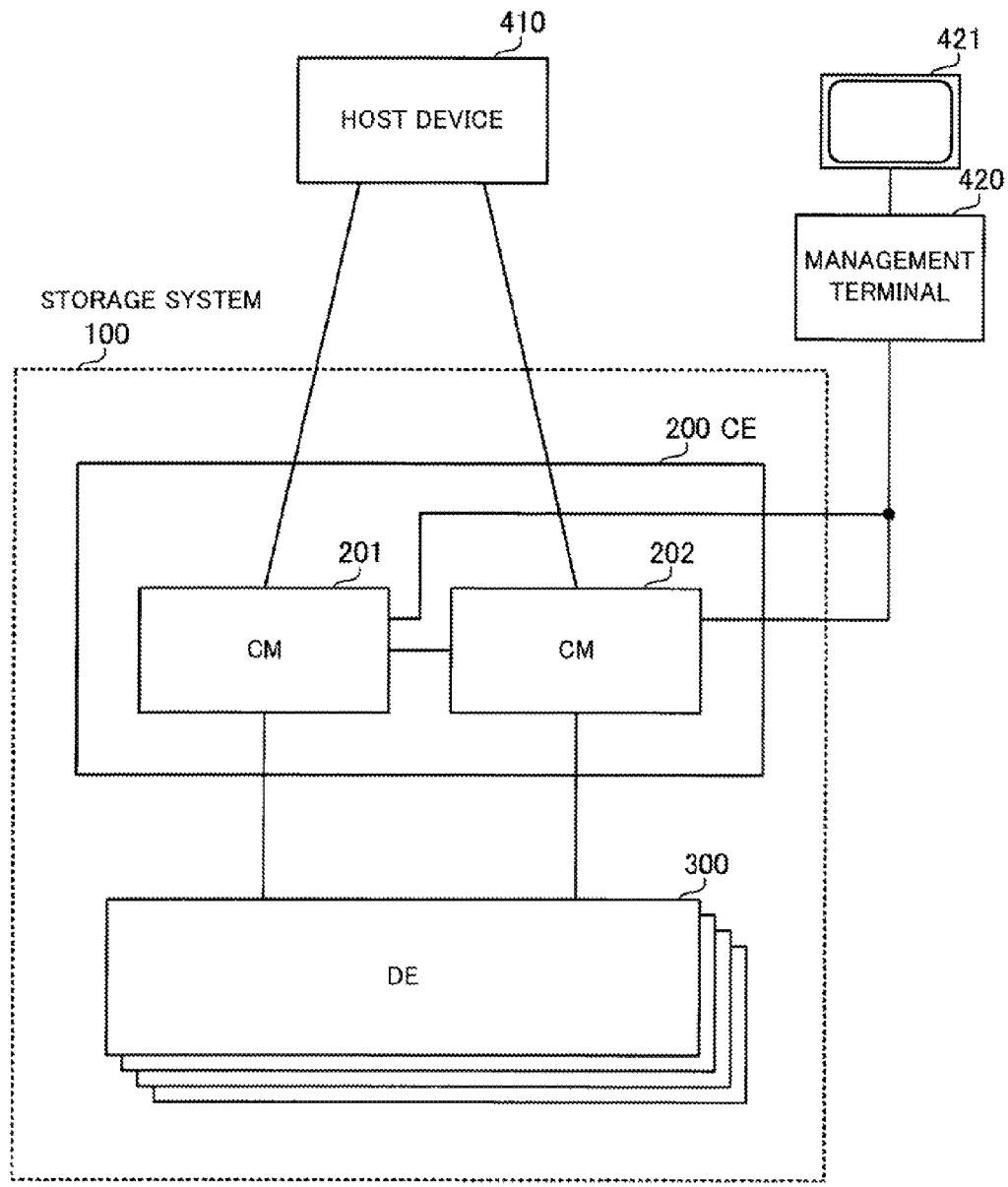
FIG. 2 illustrates a system configuration example of a storage system according to a second embodiment.

FIG. 2 illustrates a system configuration example of a storage system according to a second embodiment. The storage system 100 illustrated in FIG. 2 includes a CE (Controller Enclosure) 200 and a plurality of DEs (Drive Enclosure) 300. To the CE 200, a host device 410 and a management terminal 420 are further connected.

The CE 200 includes CMs (Controller Module) 201 and 202. According to an I/O (In/Out) request from the host device 410, the CMs 201 and 202 each read and write data from/in storage devices of the DE 300. For example, the CMs 201 and 202 manage physical storage areas realized by the storage devices of the DE 300 by using an RAID (Redundant Arrays of Inexpensive Disks), and control the accesses to the physical storage areas.

Only one CM may be provided in the CE 200, or three or more CMs may be provided therein. Note that when a plurality of CMs are provided, an access control system to the DE 300 is made to be redundant and reliability of access control processing is improved.

The DE 300 includes a plurality of storage devices as access control objects from the CMs 201 and 202. The DE 300 according to the present embodiment is a disk array device including an HDD or an SSD as a storage device. According to a SAS (Serial Attached SCSI, SCSI: Small Computer System Interface) specification, the CMs 201 and 202 perform access control to HDDs or SSDs of the DE 300. In the following description, a storage device (HDD or SSD) as an access control object from the CMs 201 and 202 mounted on the DE 300 is called a "disk device".

According to an operation of a user, the host device 410 requests access to the disk devices of the DE 300 with relation to the CMs 201 and 202. According to an operation of a user, for example, the host device 410 reads data from the disk device of the DE 300 or writes data in the disk device of the DE 300 through any of the CMs 201 and 202.

According to an operation of a maintenance worker, the management terminal 420 performs various setting processes about operations of the storage system 100 with relation to the CMs 201 and 202. To the management terminal 420, a display device 421 is connected, and the management terminal 420 allows the display device 421 to display information indicating setting information or operation conditions of the CMs 201 and 202. In the present embodiment, at the time of an initial operation of the storage system 100, information indicating whether the disk device of the DE 300 is mounted on a correct position is supplied from any of the CMs 201 and 202, and is displayed on the display device 421.

Figure 3:
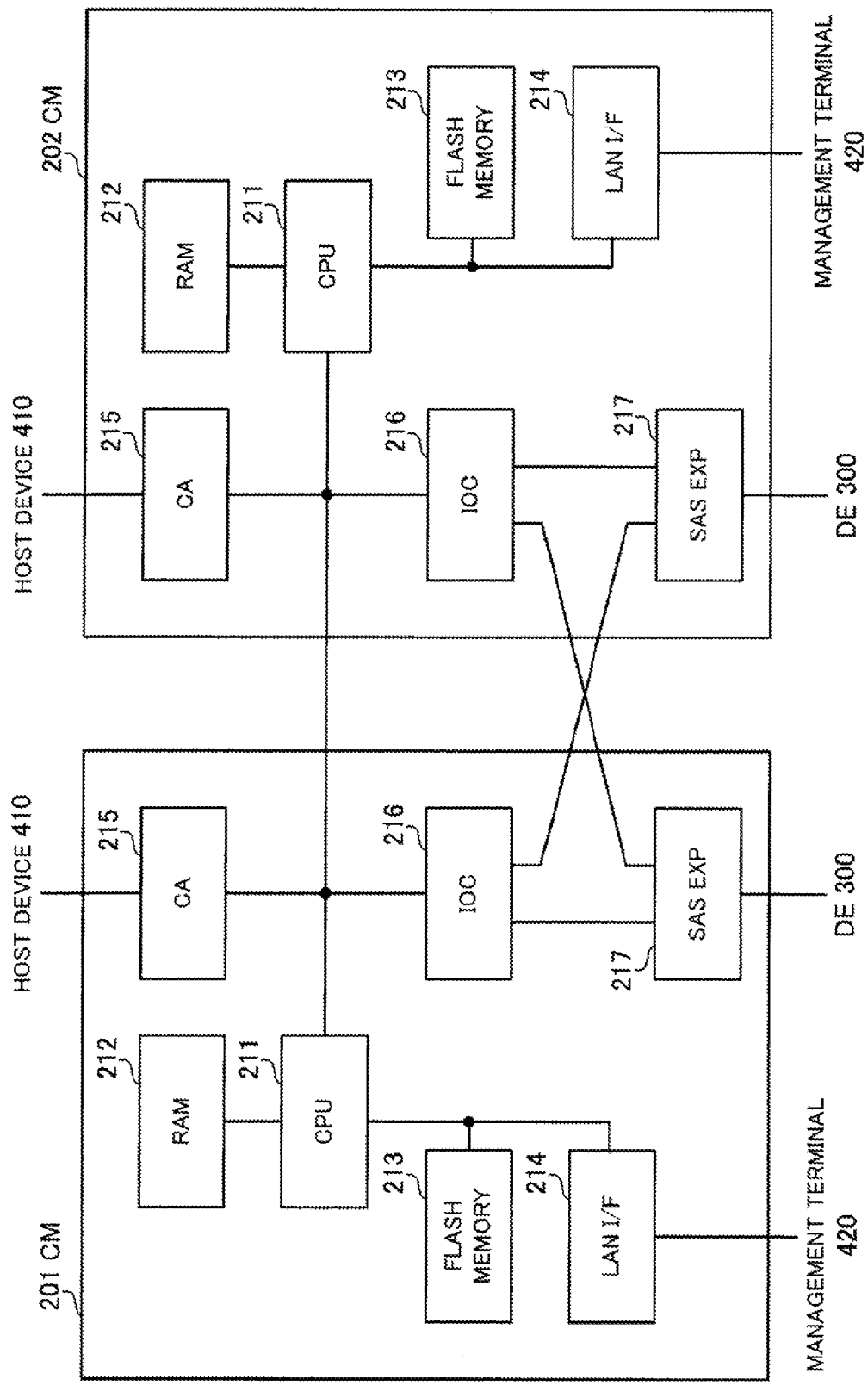
FIG. 3 illustrates a hardware configuration example of a CM.

FIG. 3 illustrates a hardware configuration example of the CM. The CMs 201 and 202 each have the same hardware configuration, and therefore only a configuration of the CM 201 will be mainly described below.

The entire CM 201 is controlled by a CPU 211. To the CPU 211, an RAM 212 and a plurality of peripheral devices are connected. The RAM 212 is used as a main storage device of the CM 201, and temporarily stores at least a part of a program executed by the CPU 211 and various data necessary for a process through this program.

To the CPU 211, a flash memory 213, a LAN (Local Area Network) interface (I/F) 214, a CA (Channel Adapter) 215, and an IOC (In/Out Controller) 216 are connected as an example of the peripheral devices. The flash memory 213 and the LAN interface 214 are connected to the CPU 211, for example, through a PCH (Platform Controller Hub) (not illustrated). The CA 215 and the IOC 216 are further connected to the CPU 211, for example, through a PCI (Peripheral Component Interconnect) switch (not illustrated).

The flash memory 213 is used as a secondary storage device of the CM 201, and stores a program executed by the CPU 211 and various data necessary for the execution. As a secondary storage device, for example, other types of nonvolatile storage devices such as an HDD may be used.

The LAN interface 214 performs an interface process for transmitting and receiving data between the management terminal 420 and the CM 201.

The CA 215 performs an interface process for transmitting and receiving data between the host device 410 and the CM 201.

The IOC 216 is a circuit which performs a SAS interface process. The IOC 216 of the CM 201 is connected to both of a SAS expander (EXP) 217 provided on the CM 201 and a SAS expander 217 provided on the CM 202. In a similar fashion, the IOC 216 of the CM 202 is also connected to both of the SAS expander 217 provided on the CM 201 and the SAS expander 217 provided on the CM 202. The SAS expander 217 of the CM201 and the SAS expander 217 of the CM 202 are connected to the DE 300.

In addition, the CMs 201 and 202 may include a plurality of IOCs 216 and SAS expanders 217, respectively.

The CPU 211 of the CM 201 and the CPU 211 of the CM 202 mutually transmit and receive data, for example, through a PCI switch each included in the CMs 201 and 202.

Figure 4:
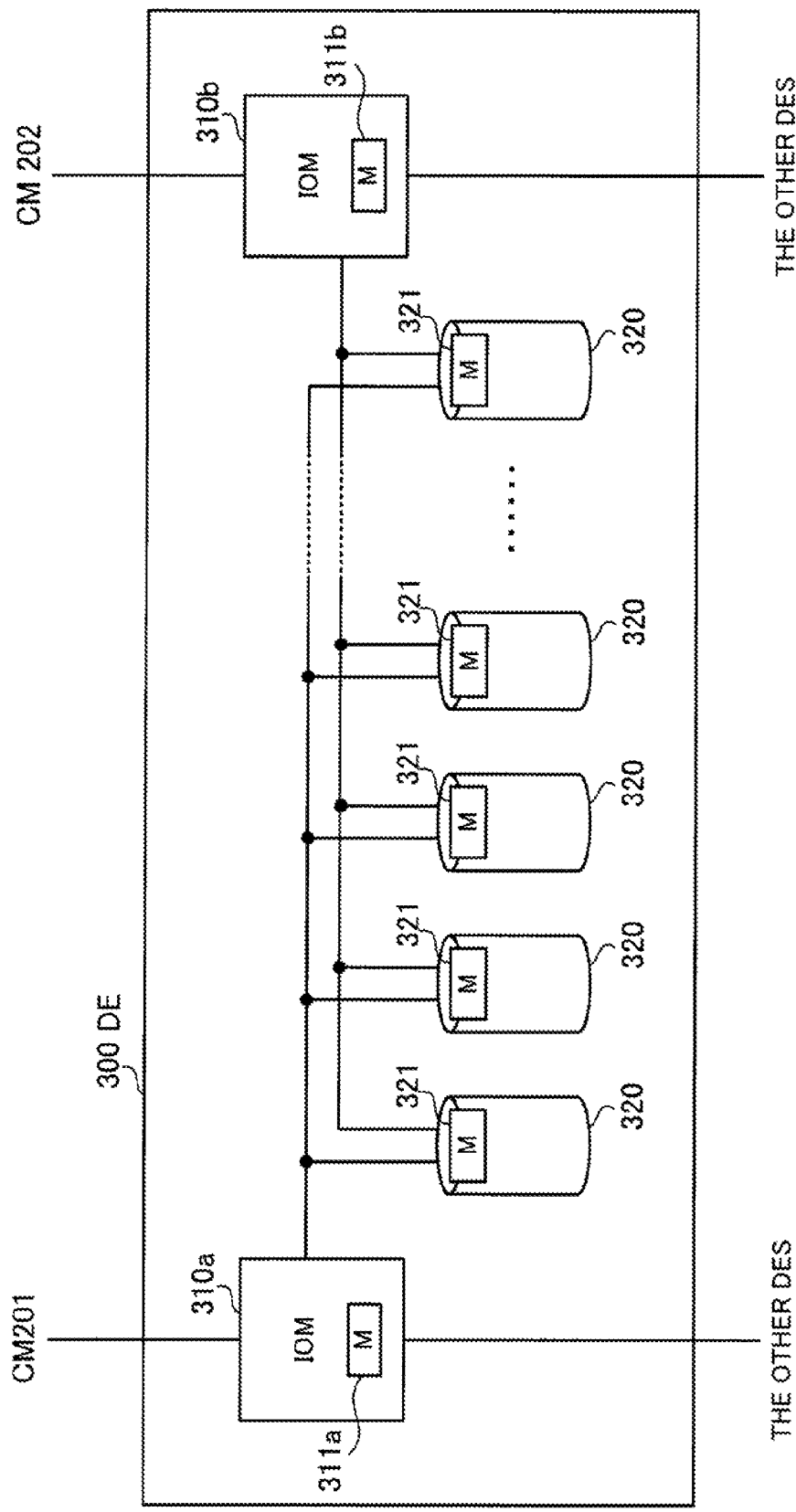
FIG. 4 illustrates a hardware configuration example of a DE.

FIG. 4 illustrates a hardware configuration example of the DE. The DE 300 includes IOMs (In/Out Module) 310a and 310b, and a plurality of disk devices 320.

The IOMs 310a and 310b totally control the DE 300 and each perform a process as the SAS expander which relays data between the CM and the disk devices 320. The IOM 310a is connected to the SAS expander 217 of the CM 201, and the IOM 310b is connected to the SAS expander 217 of the CM 202. In addition, the IOMs 310a and 310b may be connected to IOMs of the other DEs.

The disk devices 320 are deployed as an HDD or SSD. The disk device 320 further includes a nonvolatile memory area 321 in addition to a storage area being an access control object from the CMs 201 and 202. In this memory area 321, attribute information of the disk device 320 is previously stored. Examples of the attribute information include a type of the disk device 320 and a storage capacity thereof. The attribute information in the memory area 321 is readable to an external device such as an IOM through control of a controller (not illustrated) of the disk device 320.

The IOM 310a includes a nonvolatile memory 311a therein. The IOM 310a has a function of collecting attribute information from the memory area 321 of the disk device 320 connected to a subordinate of its own device, storing the attribute information in the memory 311a, and notifying the CM 201 of the attribute information. In a similar fashion, the IOM 310b also has a nonvolatile memory 311b therein and has a function of collecting attribute information from the memory area 321 of the disk device 320 connected to a subordinate of its own device, storing the attribute information in the memory 311b, and notifying the CM 202 of the attribute information.

Figure 5:
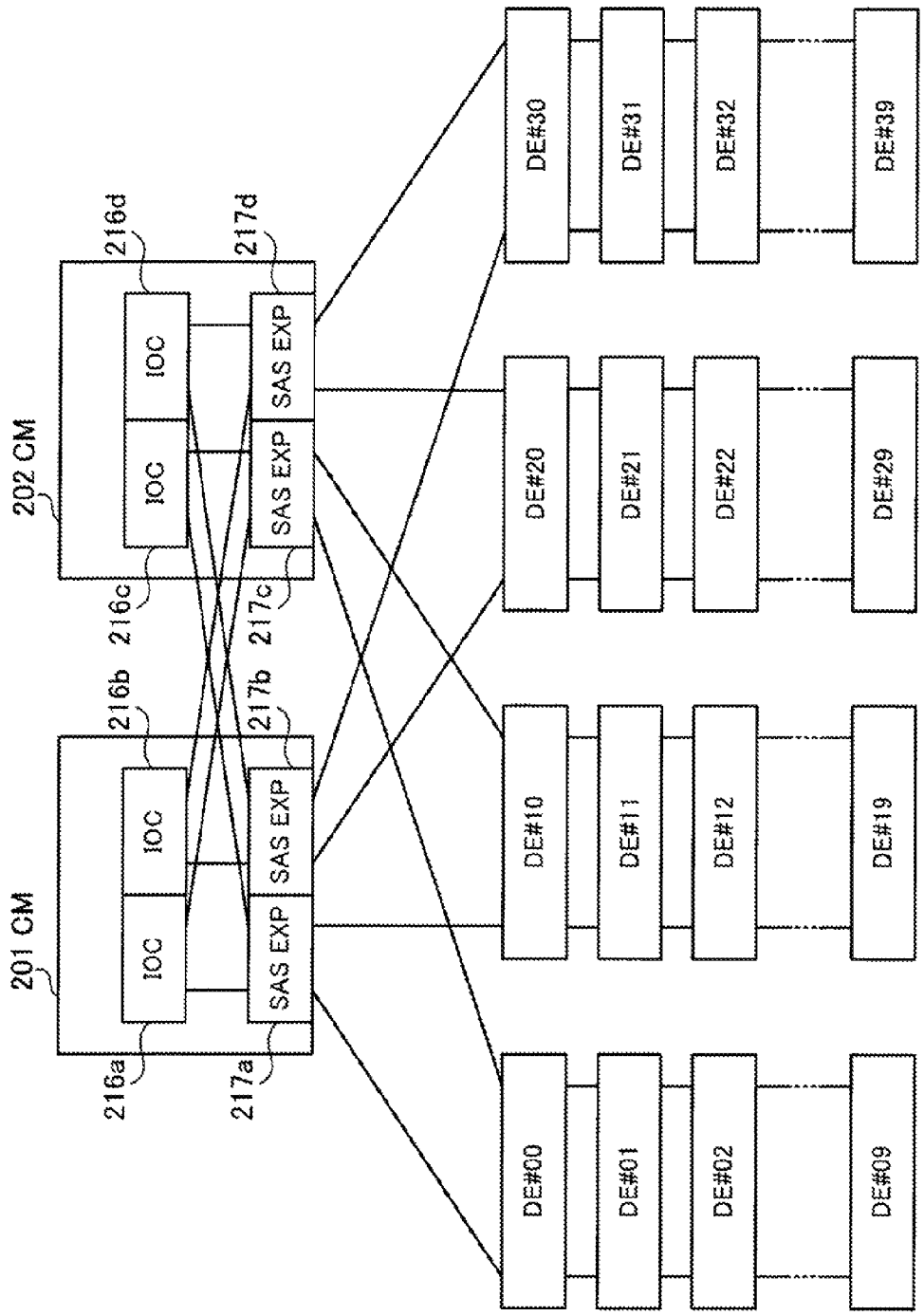
FIG. 5 illustrates an example relating to connection among CMs, a plurality of DEs, and disk devices mounted thereon.

Next, FIG. 5 illustrates an example of connection relationships among the CMs, a plurality of DEs, and disk devices to be mounted thereon.

In the storage system 100, position information is given to a position on which the DE is mounted. The position information given to the position on which the DE is mounted corresponds to a physical position of a DE slot in a rack described later. In FIG. 5, for example, "DE #00" indicates a DE mounted on a DE slot "#00".

On the other hand, for example, the CM 201 has two IOCs 216a and 216b, and two SAS expanders 217a and 217b. For example, the CM 202 also has two IOCs 216c and 216d, and two SAS expanders 217c and 217d.

The IOC 216a of the CM 201 is capable of communicating with the DEs #00 and #10 through the SAS expander 217a of the CM 201, and at the same time, communicating with the DEs #00 and #10 through the SAS expander 217c of the CM 202. The IOC 216b of the CM 201 is capable of communicating with the DEs #20 and #30 through the SAS expander 217b of the CM 201, and at the same time, communicating with the DEs #20 and #30 through the SAS expander 217d of the CM 202.

The IOC 216c of the CM 202 is capable of communicating with the DEs #00 and #10 through the SAS expander 217a of the CM 201, and at the same time, communicating with the DEs #00 and #10 through the SAS expander 217c of the CM 202. The IOC 216d of the CM 202 is capable of communicating with the DEs #20 and #30 through the SAS expander 217b of the CM 201, and at the same time, communicating with the DEs #20 and #30 through the SAS expander 217d of the CM 202.

Until ten stages at the maximum, for example, the DEs are serially connected through the IOMs included therein. In an example of FIG. 5, DEs #00 to #09 are serially connected. In the same manner as in the DE #00, the DEs #01 to #09 are also capable of communicating with the IOCs 216a and 216c through at least any one of the SAS expanders 217a and 217c. Also, DEs #10 to #19 are serially connected, and in the same manner as in the DE #10, the DEs #11 to #19 are also capable of communicating with the IOCs 216a and 216c through at least any one of the SAS expanders 217a and 217c.

Also, DEs #20 to #29 are serially connected, and in the same manner as in the DE #20, the DEs #21 to #29 are also capable of communicating with the IOCs 216b and 216d through at least any one of the SAS expanders 217b and 217d. Also, DEs #30 to #39 are serially connected, and in the same manner as in the DE #30, the DEs #31 to #39 are also capable of communicating with the IOCs 216b and 216d through at least any one of the SAS expanders 217b and 217d.

Here, based on the fact that the DE is connected to which port of which SAS expander included in the CM 201 and that the CM 201 is connected to which stage among the serially connected DEs, the CM 201 recognizes the position information (DE slot number) of the DE as a communication destination. In a similar fashion, based on the fact that the DE is connected to which port of which SAS expander included in the CM 202 and that the CM 202 is connected to which stage among the serially connected DEs, the CM 202 recognizes the position information (DE slot number) of the DE as a communication destination.

Figure 6:
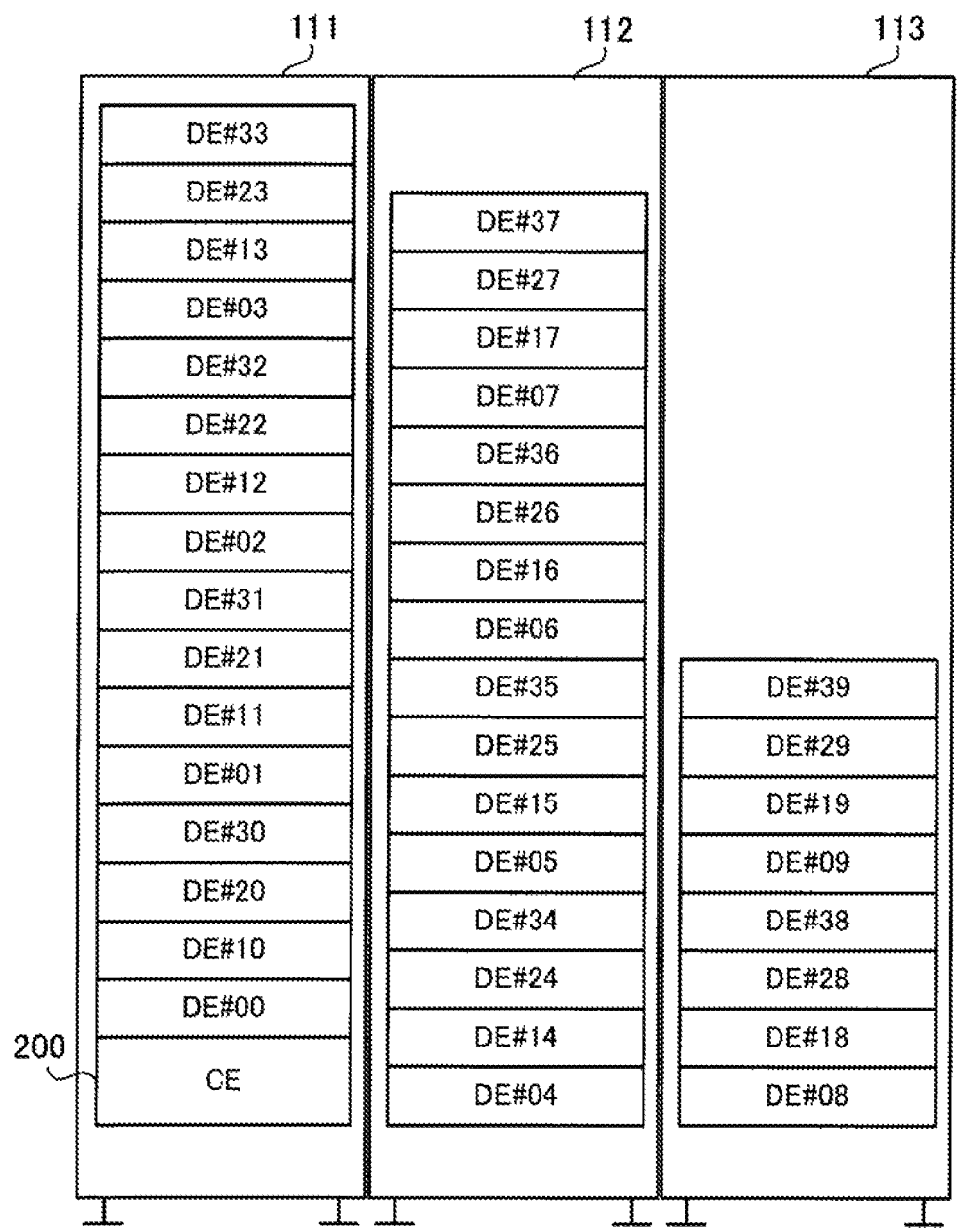
FIG. 6 illustrates a configuration example of racks on which a CE and DEs are mounted.

FIG. 6 illustrates a configuration example of racks on which the CE and DE are mounted.

The CE 200 and DEs included in the storage system 100 are mounted, for example, on racks 111 to 113 as illustrated in FIG. 6. On the rack 111, a slot on which the CE 200 is mounted and 16 DE slots are provided, 16 DE slots are provided on the rack 112, and 8 DE slots are provided on the rack 113. To each DE slot of the racks 111 to 113, a DE slot number based on the connection relationship between the DEs illustrated in FIG. 5 is fixedly given.

Figure 7:
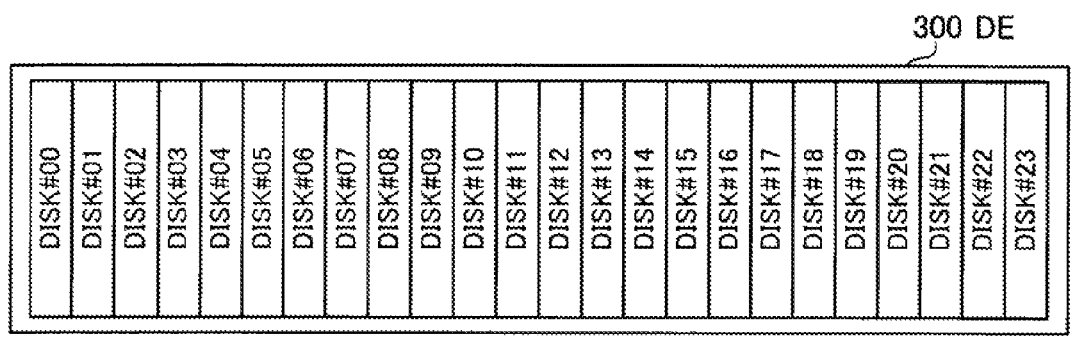
FIG. 7 illustrates a mounting example of disk devices in a DE.

FIG. 7 illustrates a mounting example of disk devices of the DE.

On the DE 300 mounted on the DE slot, for example, 24 disk slots are provided, and a disk device is mounted on each disk slot. To each disk slot, a disk slot number as position information of the disk device is given. In FIG. 7, for example, the "DISK #00" indicates a disk device mounted on the disk slot "#00".

Based on the fact that the disk device is connected to which port of the IOM, the IOM included in the DE 300 recognizes the position information (disk slot number) of the disk device connected to its own device. For example, the IOM collects attribute information from a memory area (the memory area 321 of FIG. 4) of the disk device connected to its own device. According to a request from the CM, the IOM further notifies the CM of the collected attribute information correspondingly to the disk slot number. As described above, since recognizing a DE slot number corresponding to the DE as a communication destination, the CM further collects the attribute information of the disk device correspondingly to the DE slot number and disk slot number through the IOM of the DE.

Incidentally, in the storage system having the above-described configuration, in many cases, the CE and DEs are assembled in a rack, and shipped so as to be immediately used in an installation place. In this case, before shipping from a factory, there is performed work such as each operation test of the CE and DE, mounting of the CE and DE on a rack, and setting of user configuration information to the CE. When the above work is finished, a power of the storage system is activated. For example, the CM started according to a power-on determines whether a correct disk device set to user configuration information is connected and a disk device is out of order. If determining that there is no problem, the CM performs a volume formation process in which the disk device is assembled as a storage area of the RAID.

However, there is a problem that in response to an increase in the number of the disk devices mounted on the storage system, time necessary for the series of work before the shipping elongates. To cope with the problem, think of a storage system in which only setting of the user configuration information and individual operation tests of the CE and DE are performed before shipping and the shipping is directly performed in a state in which the CE and DE are not assembled in a rack. In this case, mounting work of the CE and DE to a rack is performed by workers on a job site on which the storage system is installed. Setting work of the user configuration information may also be performed in an installation place of the storage system.

When mounting work of the CE and DEs is performed in an installation place of the storage system, a worker needs to confirm whether a correct disk device is mounted as defined in each disk slot. Particularly, as the number of the mounted disk devices more increases, a mounting error of the disk device is easy to be generated more, and therefore the above-described confirmation work becomes important. Here, through the above-described determination process based on the user configuration information due to the CM started according to power-on, a position of the disk slot on which the correct disk device is not mounted may be detected. However, a worker needs to determine whether how the disk device is freshly mounted and a disk device to be freshly procured is necessary, and as a result, enormous trouble is taken.

On the other hand, in the storage system 100 according to the present embodiment, the CE 200 and DE 300 are mounted on the storage system 100. When the storage system 100 is started in response to a power-on, a disk configuration confirmation process is performed by using the CM. In addition to whether a disk device is mounted on a correct position, this disk configuration confirmation process includes a process for notifying, through the screen display, a worker of determination results in which how a disk device is freshly mounted or a disk device to be freshly procured is necessary.

This disk configuration confirmation process is preferably performed through any one of the CMs 201 and 202. Suppose in the following description that the disk configuration confirmation process is performed through the CM 201.

Figure 8:
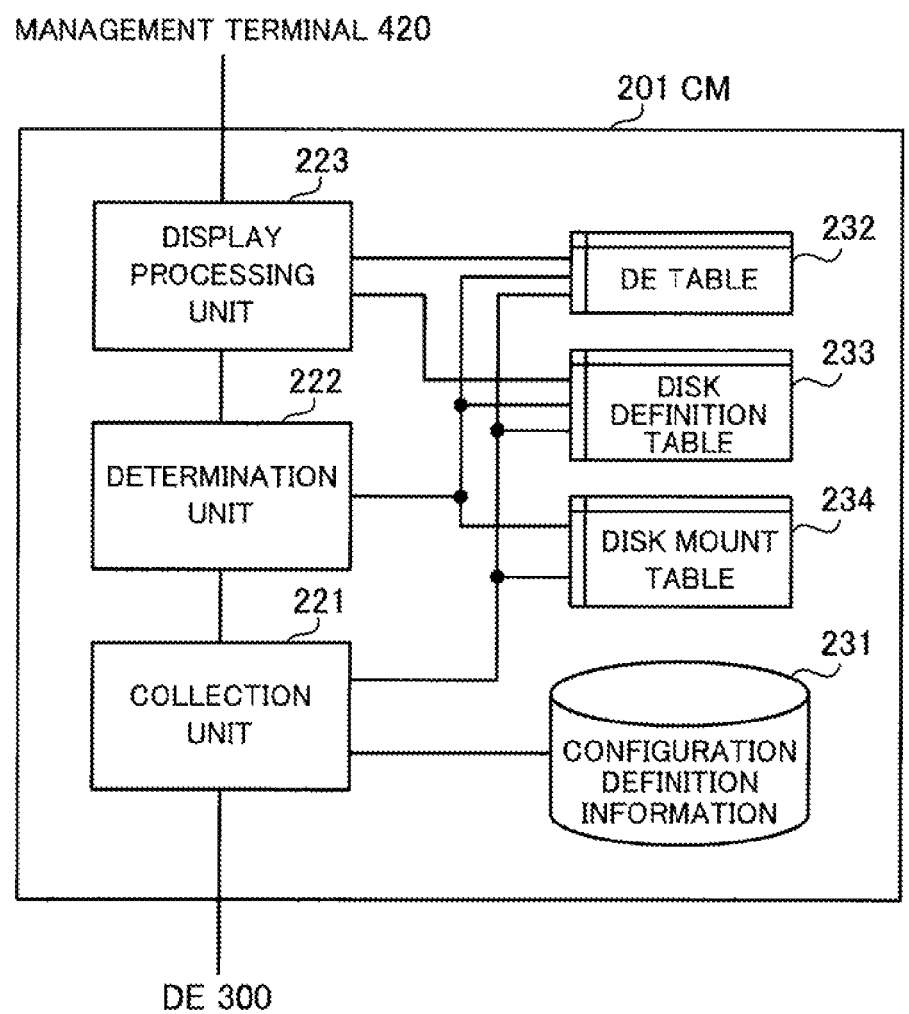
FIG. 8 is a block diagram illustrating a configuration example of a processing function included in a CM.

FIG. 8 is a block diagram illustrating a configuration example of a processing function included in the CM.

The CM 201 includes a collection unit 221, a determination unit 222, and a display processing unit 223. For example, when the CPU 211 of the CM 201 executes a predetermined program, processes of the collection unit 221, determination unit 222, and display processing unit 223 are implemented. In addition, in the flash memory 213 of the CM 201, the configuration definition information 231 is previously stored. When processes of the collection unit 221, determination unit 222, and display processing unit 223 are implemented, a DE table 232, a disk definition table 233, and a disk mount table 234 are stored in the RAM 212 of the CM 201.

To the configuration definition information 231, attribute information of the disk device to be mounted on the storage system 100 is set correspondingly to a DE slot number and a disk slot number. This configuration definition information 231 is set before the storage system 100 is shipped from a factory. In the present embodiment, the attribute information includes a type of the disk device and a storage capacity thereof. As a type of the disk device, for example, information indicating an HDD or an SSD of the SAS system is set. Other examples of the attribute information may include information according to an access speed of the disk device and information according to a manufacturer or a type number of the disk device.

The collection unit 221 collects attribute information from the disk devices mounted on each DE 300 connected to the CM 201. The collection unit 221 deploys the DE table 232, disk definition table 233, and disk mount table 234 in the RAM 212. The collection unit 221 registers the attribute information collected from the disk devices in the disk mount table 234 and registers the attribute information set in the configuration definition information 231 in the disk definition table 233.

The determination unit 222 compares the attribute information registered in the disk definition table 233 with the attribute information registered in the disk mount table 234. Through the process, the determination unit 222 determines whether the disk devices currently mounted are matched with the disk devices defined in the configuration definition information 231. In this determination process, there is determined a position of a disk slot on which a disk device the attribute information of which is not matched with information defined in the configuration definition information 231 is mounted. In addition, for example, it is determined that preferably, a disk device mounted on which disk slot or a DE mounted on which DE slot is freshly mounted on which position. The determination unit 222 registers information indicating a determination result in the DE table 232, disk definition table 233, and disk mount table 234.

Here, FIG. 9 illustrates an example of the information registered in the DE table, disk definition table, and disk mount table.

In the DE table 232, a determination result of a state of the DE currently mounted is registered for each DE slot number. The DE table 232 illustrated in FIG. 9 indicates an initial state created by the collection unit 221 and a column of the determination result is blank in this state.

In the column of the determination result, the following information is registered by the determination unit 222. In the case where the attribute information units of all the disk devices in the DE mounted on the DE slot are matched with the information defined in the configuration definition information 231, the DE slot is registered as "OK" in the column of the determination result corresponding to the DE slot. In the case where the attribute information of at least one disk device in the DE mounted on the DE slot is not matched with the information defined in the configuration definition information 231, the DE slot is registered as "ERROR" in the column of the determination result corresponding to the DE slot. Note even in the second case that when a DE to be originally mounted on the disk slot is mounted on an erroneous position, a DE slot number indicating a position on which a DE to be mounted is currently mounted is registered in the column of the determination result.

In the disk definition table 233, the attribute information and the determination result of a state of the disk device currently mounted are registered for each disk slot number of each DE. As the attribute information, a disk type and a disk capacity are registered. The collection unit 221 registers the attribute information set in the configuration definition information 231 in the column of the attribute information of the disk definition table 233. A column of the attribute information corresponding to a disk slot on which the disk device is not mounted is made to be blank. The disk definition table 233 illustrated in FIG. 9 indicates a state in which the attribute information is registered by the collection unit 221, and the column of the determination result is blank in this state.

In the column of the determination result, the following information is registered by the determination unit 222. If the attribute information units of the disk device mounted on the disk slot are matched with information defined in the configuration definition information 231, the disk slot is registered as "OK" in the column of the determination result corresponding to the disk slot. If not, the disk slot is registered as "ERROR". Note even in the second case that when a disk device to be originally mounted on the disk slot is mounted in an erroneous position, a DE slot number and a disk slot number indicating a position on which a disk device to be mounted is currently mounted are registered in the column of the determination result.

In the disk mount table 234, the attribute information and the determination result of a state of the disk device currently mounted are registered for each disk slot number of each DE. As the attribute information, a disk type and a disk capacity are registered. The collection unit 221 registers the attribute information collected from the disk devices of each DE 300 connected to the CM 201 in the column of the attribute information of the disk mount table 234. A column of the attribute information corresponding to a disk slot on which the disk device is not mounted is made to be blank. The disk mount table 234 illustrated in FIG. 9 indicates a state in which the attribute information is registered by the collection unit 221, and a column of the determination result is blank in this state.

In the column of the determination result, the following information is registered by the determination unit 222. If the attribute information units of the disk device mounted on the disk slot are matched with information defined in the configuration definition information 231, the disk slot is registered as "OK" in the column of the determination result corresponding to the disk slot. If not, the disk slot is registered as "ERROR". Note even in the second case that when the disk device mounted on the disk slot is to be moved to another position, the disk slot is registered as "MOVE" in the column of the determination result.

Returning to FIG. 8, a description will be made below.

With reference to the disk definition table 233 and the disk mount table 234, the determination unit 222 performs a comparison process of the attribute information in units of the DE. The determination unit 222 then performs a comparison process of the attribute information in units of the disk device. Based on the comparison process of the attribute information in units of the DE, the determination unit 222 registers a determination result in the DE table 232. At this time, when the number of the DE slots which are registered as "ERROR" is greater than a predetermined number, the determination unit 222 determines that the entire system is abnormal, and ends the process. As a result, the determination unit 222 fails to perform a comparison process of the attribute information in units of the disk device having a high processing load and issues a warning at short times.

Based on the determination results recorded in the DE table 232, disk definition table 233, and disk mount table 234, the display processing unit 223 generates display information for displaying a determination result of a disk configuration and supplies it to the management terminal 420. The display processing unit 223 allows the management terminal 420 to display the determination result of the disk configuration on the display device 421.

Processes of the collection unit 221, determination unit 222, and display processing unit 223 will be described below with reference to a flowchart. At first, FIGS. 10 and 11 are a combined flowchart illustrating an example of a processing procedure of the collection unit and the determination unit.

Figure 10:
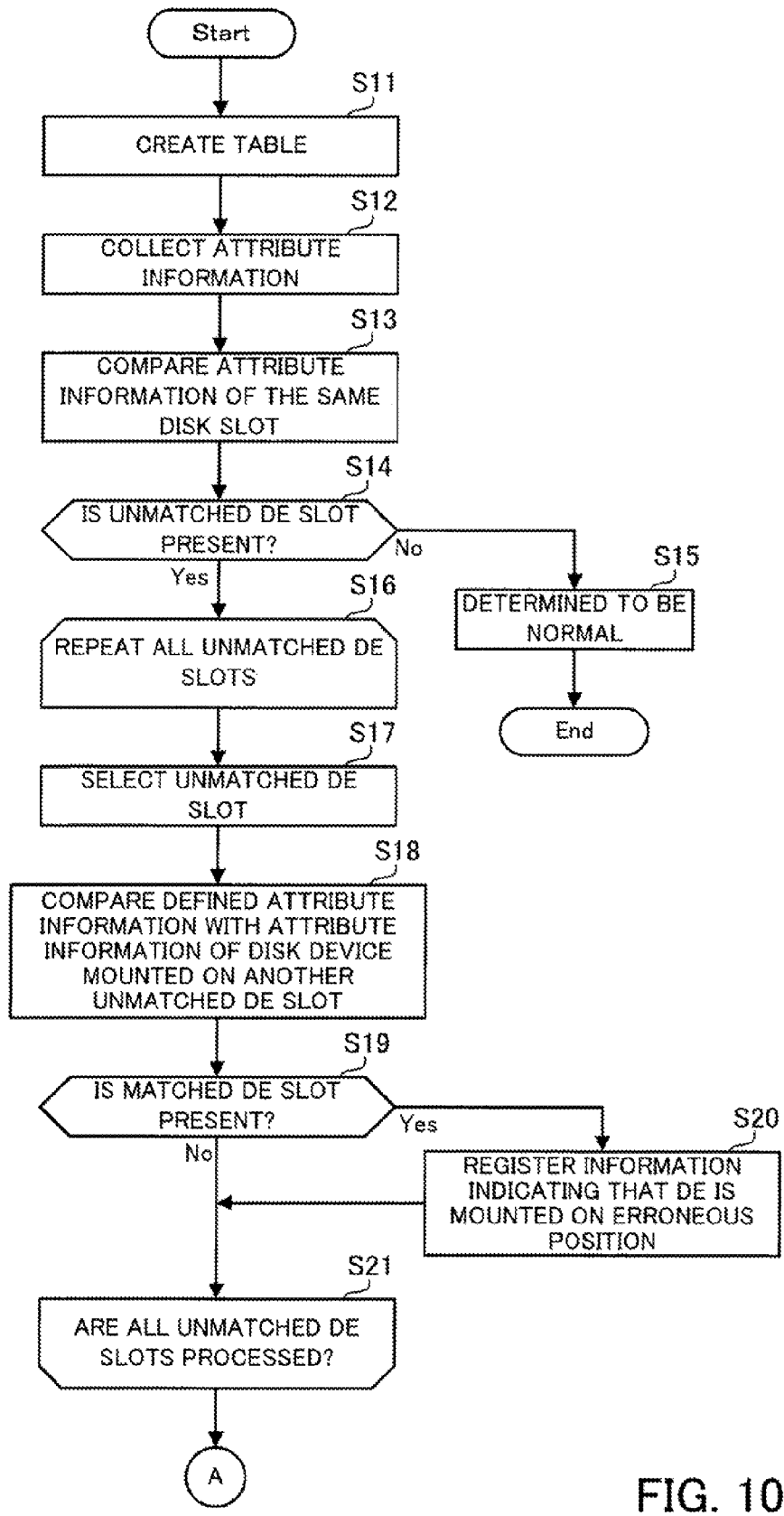
FIG. 10 is a flowchart (part one) illustrating an example of a processing procedure of a collection unit and a determination unit.
Figure 11:
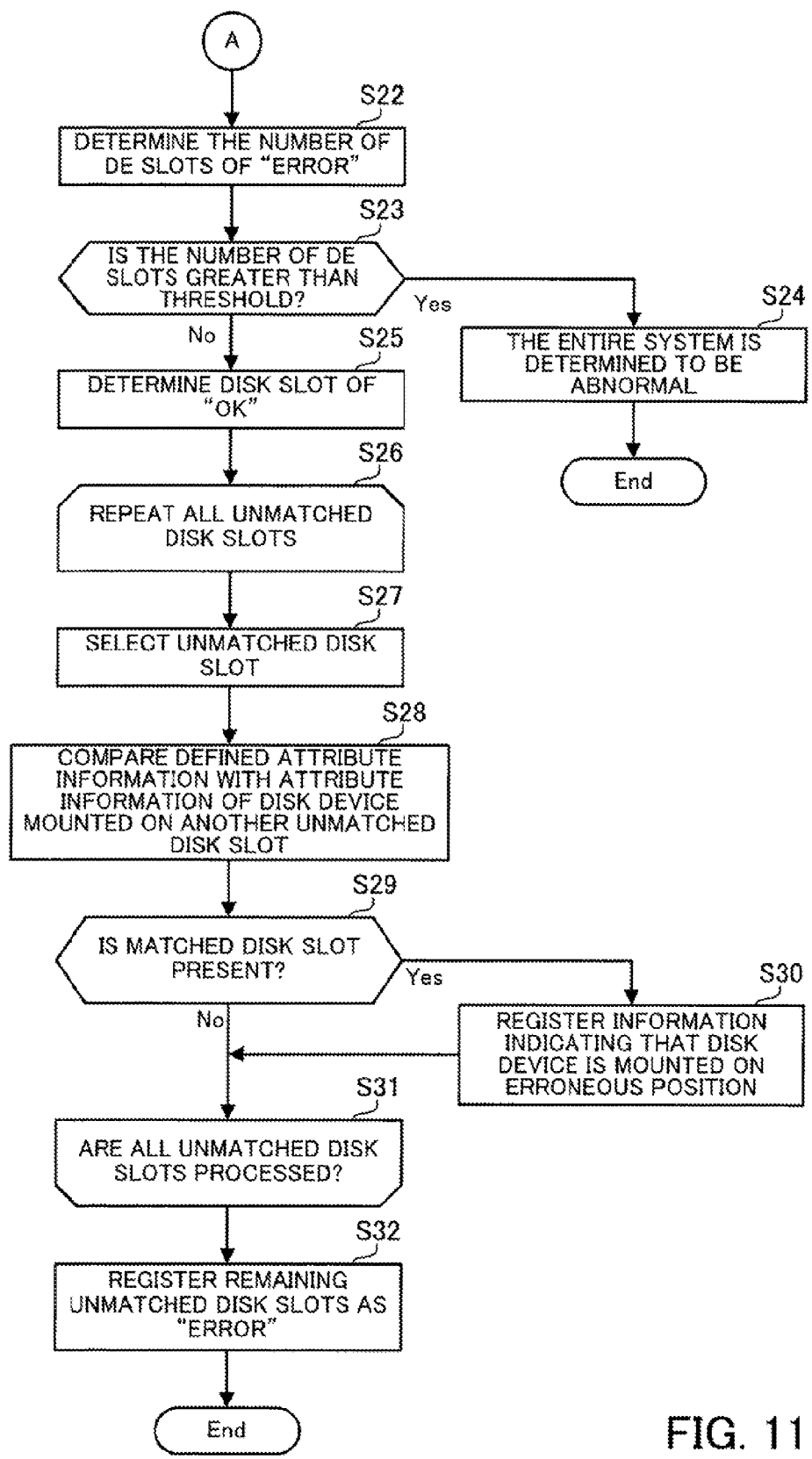
FIG. 11 is a flowchart (part two) illustrating an example of a processing procedure of a collection unit and a determination unit.

For example, when power of the CM 201 is turned on and the CM 201 is started up, a process of FIG. 10 is started. Alternatively, a process of FIG. 10 may be started according to a request from the management terminal 420 or an operation for a predetermined switch provided on the CM 201. Fundamentally, a process of FIG. 10 may be performed when mounting work and connecting work for the CM and DE are finished in an installation place of the storage system 100 or after a device in the storage system 100 is exchanged.

(Step S11) The collection unit 221 creates the DE table 232, disk definition table 233, and disk mount table 234 in the RAM 212. The collection unit 221 registers the attribute information set in the configuration definition information 231 in the disk definition table 233. At this time, each column of the determination results of the DE table 232 and the disk definition table 233, and each column of the attribute information and determination results of the disk mount table 234 are blank.

(Step S12) The collection unit 221 collects the attribute information units from the disk devices mounted on each DE 300 connected to the CM 201 and registers them in the disk mount table 234. When completing collection and registration of the attribute information, the collection unit 221 notifies the determination unit 222 of the above effect. Through the process, the collection unit 221 starts a process of step S13.

(Step S13) The determination unit 222 compares both of the attribute information units registered in the same disk slot between the disk definition table 233 and the disk mount table 234.

As a result of the comparison process, when both of the attribute information units are matched in all the disk slots of the same DE slot, the determination unit 222 registers the DE slot as "OK" in the column of the determination result of the DE table 232 corresponding to the DE slot. On the other hand, when both of the attribute information units are not matched in at least one disk slot of the same DE slot, the determination unit 222 keeps blank the columns of the determination result in the DE table 232 corresponding to the DE slot. When even any one of the disk type and the disk capacity is not matched among the attribute information units, the determination unit 222 determines that both of the attribute information units are not matched with each other. Hereinafter, a DE slot in which the column of the determination result is blank in the DE table 232 is called an "unmatched DE slot".

(Step S14) As a result of the comparison at step S13, when both of the attribute information units are matched in all the disk slots (namely, when the DE slot is registered as "OK" in all the DE slots of the DE table 232) (No at step S14), the determination unit 222 performs a process of step S15. On the other hand, when there is at least one disk slot in which both of the attribute information units are not matched with each other (namely, when there are one or more unmatched DE slots which is not registered as "OK" in the DE table 232) (Yes at step S14), the determination unit 222 performs a process of step S16.

(Step S15) The determination unit 222 notifies the display processing unit 223 that a table registration process is finished and a mounted state of the disk device is normal. As described later, the display processing unit 223 receiving the notification generates display information indicating that the disk configuration is normal, and supplies it to the management terminal 420. The process permits a confirmation worker to recognize that the disk configuration is normal through the display device 421 of the management terminal 420.

(Step S16) The determination unit 222 performs a process up to step S21 being a loop end with relation to all the unmatched DE slots.

(Step S17) The determination unit 222 selects one unmatched DE slot.

(Step S18) The determination unit 222 compares the attribute information units (all the attribute information units registered in the disk definition table 233) defined in all the disk slots of the selected unmatched DE slot with the attribute information units (all the attribute information units registered in the disk mount table 234) of the disk devices mounted on all the disk slots of the other unmatched DE slots except the selected unmatched DE slot. The determination unit 222 further extracts a combination of the unmatched DE slots in which both of the attribute information units are matched with each other. Note that, in a process of this step S18, the unmatched DE slot in which a DE slot number is registered in the column of the determination result of the DE table 232 through the process of step S20 described later is excluded from a comparison object with the selected unmatched DE slot.

(Step S19) When a combination of the unmatched DE slots in which both of the attribute information units are matched through the comparison process of step S18 is extracted (Yes at step S19), the determination unit 222 performs a process of step S20. On the other hand, when the unmatched DE slot in which both of the attribute information units are matched is not extracted (No at step S19), the determination unit 222 registers the DE slot as "ERROR" in the column of the determination result corresponding to the unmatched DE slot selected at step S17 in the DE table 232.

(Step S20) When a combination of the unmatched DE slots in which both of the attribute information units are matched through the comparison process of step S18 is extracted, a DE to be mounted on the unmatched DE slot selected at step S17 is mounted on another unmatched DE slot extracted based on the disk mount table 234. In this case, the determination unit 222 registers a DE slot number of the other unmatched DE slot extracted based on the disk mount table 234 at step S18 in the column of the determination result corresponding to the unmatched DE slot selected at step S17 in the DE table 232.

At step S18 as described above, the unmatched DE slot in which a DE slot number is registered in the column of the determination result in the DE table 232 through a process of step S20 is excluded from a comparison object with the selected unmatched DE slot. Through the process, the registration process at step S20 is performed so as not to overlap the DE slot number registered in the column of the determination result in the DE table 232.

The DE slot number registered in the column of the determination result at step S20 indicates a position on which a DE to be originally mounted on the DE slot corresponding to the column of the determination result is erroneously mounted currently.

Among the columns of the determination result of the unmatched DE slot in the DE table 232, the determination unit 222 registers the DE slot as "ERROR" in the column of the determination result in which none of "OK" and the DE slot number are registered and the column is made to be blank. The DE slot which is registered as "ERROR" in the column of the determination result represents that service is not restored to correct conditions by freshly mounting the DE mounted on another DE slot.

(Step S21) When a process in the loop is performed about all the unmatched DE slots, the determination unit 222 performs a process of step S22.

As a result of the process up to the above step S21, any of "OK", "ERROR", and the DE slot number are registered in all the columns of the determination result in the DE table 232.

(Step S22) The determination unit 222 determines the number of the DE slots which are registered as "ERROR" in the DE table 232.

(Step S23) The determination unit 222 determines whether the number of the DE slots registered as "ERROR", which is determined at step S22, is greater than a predetermined threshold. If so (Yes at step S23), the determination unit 222 performs a process of step S24. If not (No at step S23), the determination unit 222 performs a process of step 525.

(Step S24) In processes of the after-mentioned step S25 or later, a comparison process of the attribute information in units of the disk device is performed in the DE slot which is registered as "ERROR". Suppose, however, that it is determined that the number of the DE slots which are registered as "ERROR" is greater than the threshold and is too many. In this case, a load of the comparison process of the attribute information in units of the disk device increases and processing time elongates until a final determination result is displayed. In addition, when the number of the DE slots which are registered as "ERROR" is determined to be too many, there is a high possibility that information set in the configuration definition information 231 is erroneous or the DE is erroneously ordered. In the above cases, the need of the comparison process of the attribute information in units of the disk device is low.

To cope with the problem, when the number of the DE slots which are registered as "ERROR" is greater than the threshold (Yes at step S23), the determination unit 222 determines that the entire system is abnormal and notifies the display processing unit 223 of the above effect and that the table registration process is finished. As described later, the display processing unit 223 receiving the notification generates display information for notifying the management terminal 420 that the entire system is abnormal, and supplies it to the management terminal 420.

Note that processes of steps S22 and S23 may be performed, for example, before step S16.

Here, processes up to the above step S24 will be described with reference to a specific mounting state of the disk device.

Figure 12:
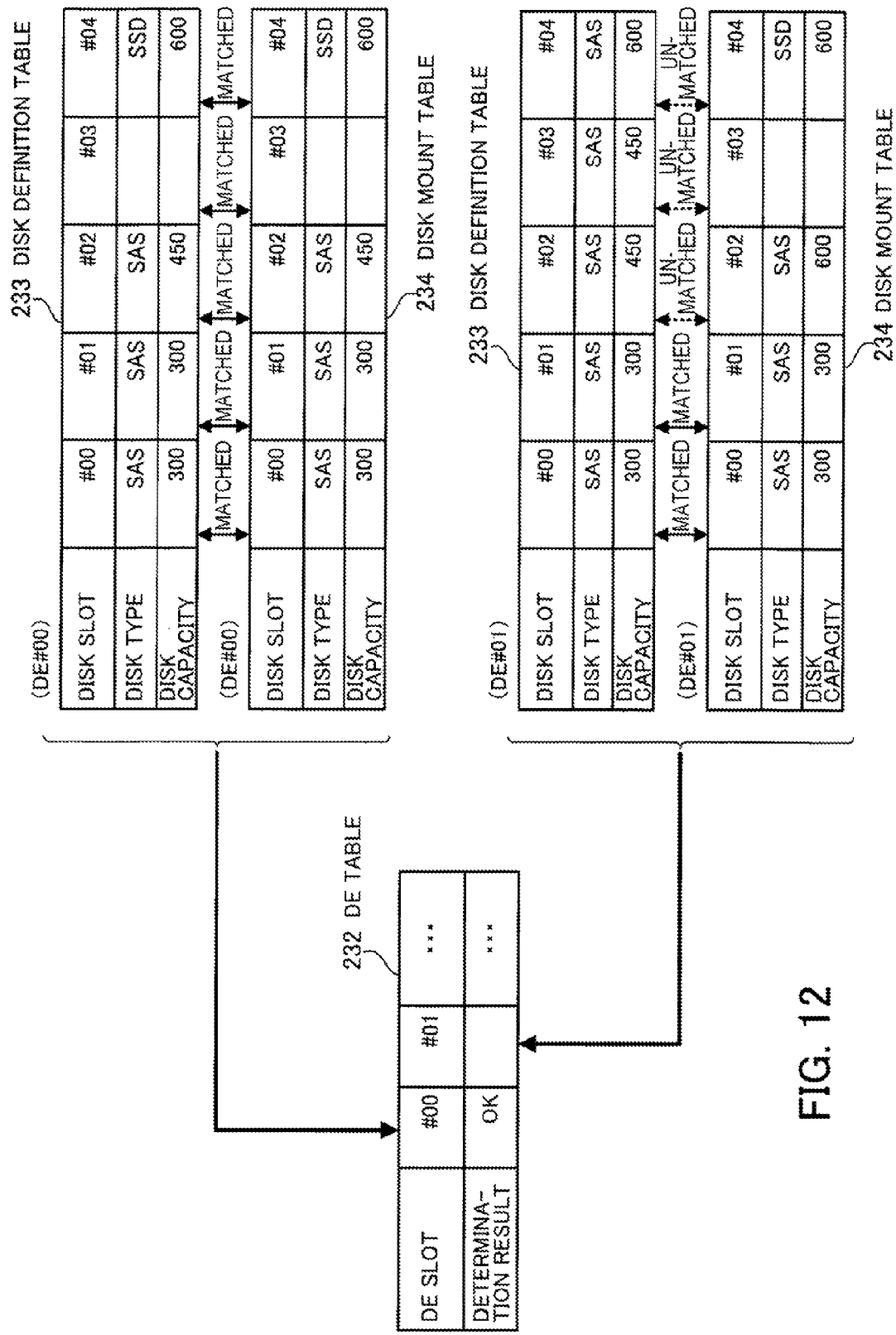
FIG. 12 illustrates a detection example of an unmatched DE slot.

FIG. 12 illustrates a detection example of the unmatched DE slot. In an easy-to-understand manner in FIG. 12, the number of the disk slots included in each DE is supposed to be five slots from "#00" to "#04".

At step S13 of FIG. 10, the determination unit 222 compares both of the attribute information units registered in the same disk slot between the disk definition table 233 and the disk mount table 234. At top right of FIG. 12, the disk definition table 233 and disk mount table 234 about the DE slot "#00" are illustrated. Between the above tables, both of the attribute information units registered about all the disk slots are matched with each other. In this case, the determination unit 222 registers the DE slot as "OK" in the column of the determination result of the DE slot "#00" in the DE table 232.

On the other hand, at bottom right of FIG. 12, the disk definition table 233 and disk mount table 234 about the DE slot "#01" are illustrated. Between the above tables, both of the attribute information units are matched about the disk slots "#00" and "#01". On the other hand, both of the attribute information units are not matched about the disk slots "#02" to "#04". In this case, the determination unit 222 detects that the DE slot "#01" is an unmatched DE slot, and temporarily keeps blank the column of the determination result of the DE slot "#01" in the DE table 232.

Figure 13:
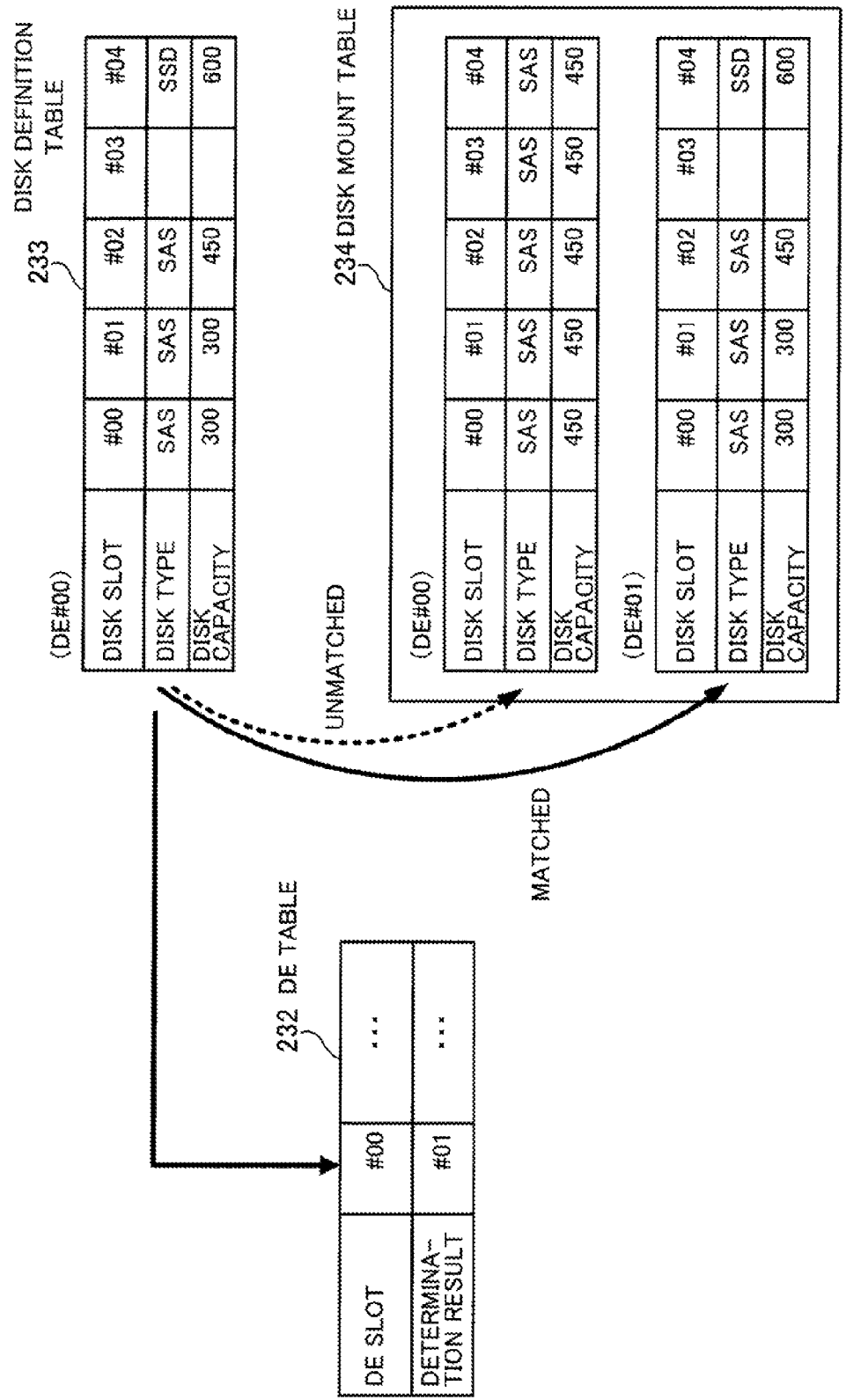
FIG. 13 illustrates an example of the case where a DE mounted on an erroneous position is detected.

FIG. 13 illustrates an example of the case where the DE mounted on an erroneous position is detected. In an easy-to-understand manner in FIG. 13, the number of the disk slots included in each DE is supposed to be five slots from "#00" to "#04".

In a loop process of steps S16 to S21 of FIG. 10, the attribute information units are compared between both of the unmatched DE slots. In an example of FIG. 13, the DE slot "#00" is supposed to be an unmatched DE slot. In this case, the determination unit 222 determines whether the attribute information defined in the DE slot "#00" (namely, attribute information about the DE slot"#00" registered in the disk definition table 233) is matched with the attribute information of the disk device mounted on another DE slot (namely, attribute information about another DE slot in the disk mount table 234) (step S18 of FIG. 10).

In an example of FIG. 13, the attribute information defined in the DE slot "#00" is matched with the attribute information of the disk devices mounted on the DE slot "#01". In this case, the determination unit 222 registers a slot number of the DE slot "#01" in the column of the determination result of the DE slot "#00" in the DE table 232. The "#01" registered in the column of the determination result of the DE slot "#00" represents that the DE to be mounted on the DE slot "#00" is erroneously mounted on the DE slot "#01". In other words, when the DE mounted on the DE slot "#01" is freshly mounted on the DE slot "#00", a DE mounted state of the DE slot "#00" is restored to a correct state.

According to the processes of steps S19 and S20 of FIG. 10, the DE slot is registered "ERROR" in the column of the determination result corresponding to the DE table 232 about the disk slots in which the DE to be mounted is not mounted on another DE slot.

FIGS. 14A, 14B, and 14C each illustrates an example of a state of the DE table based on the comparison result of the attribute information in units of the DE slot.

In FIG. 14A, in the column of the determination result corresponding to the DE slots "#00", "#10", and "#11", the DE slot numbers "#11", "#00", and "#10" are registered, respectively. In this case, a DE mounted on the DE slot "#11" is freshly mounted on the DE slot "#00", a DE mounted on the DE slot "#00" is freshly mounted on the DE slot "#10", and a DE mounted on the DE slot "#10" is freshly mounted on the DE slot "#11", thus changing a mounted state of the DE to a correct state.

At steps S22 and S23 of FIG. 11, the determination unit 222 compares the number of the DE slots determined as "ERROR" with a predetermined threshold. Here, assuming, for example, that the threshold is set to "five", FIG. 14B illustrates an example of the case where the number of the DE slots determined as "ERROR" is equal to "two" which is smaller than or equal to the threshold, and FIG. 14C illustrates an example of the case where the number of the DE slots determined as "ERROR" is equal to "six" which is greater than the threshold. In the case of FIG. 14B, the determination unit 222 continues a disk configuration confirmation process. On the other hand, in the case of FIG. 14C, the determination unit 222 determines that the entire system is abnormal, and notifies a worker of that effect through a process of the display processing unit 223, and ends the disk configuration confirmation process.

Returning to FIG. 11, a description will be made below.

(Step S25) About each DE slot determined as "ERROR", the determination unit 222 compares both of the attribute information units which are registered in the column of the same disk slot of the disk definition table 233 and the disk mount table 234. About the disk slot in which both of the attribute information units are matched, the determination unit 222 registers the disk slot as "OK" in the column of each determination result of the disk definition table 233 and the disk mount table 234.

In the following description, a disk slot which is not registered as "OK" in the column of the determination result at step S25 is called the "unmatched disk slot".

Here, the unmatched disk slots are included only in the DE slot which is registered as "ERROR". Therefore, the disk slots as a processing object at the next step S26 or later are only disk slots included in the DE slot which is registered as "ERROR". That is, not only disk slots included in the DE slot which is registered as "ERROR" but also disk slots included in the DE slot in which a DE slot number is registered in the column of the determination result of the DE table 232 is excluded from a processing object of the step S26 or later. Therefore, the time necessary for a process of the step S26 or later may be shortened.

(Step S26) The determination unit 222 performs a process (comparison process in units of disk slot) up to step S31 being a loop end with relation to all the unmatched disk slots of the DE slot which is registered as "ERROR". Note that among the unmatched disk slots, the determination unit 222 excludes from an object of loop process a disk slot (namely, a disk slot defined so as not to mount the disk device) the attribute information of which is not registered in the disk definition table 233.

(Step S27) The determination unit 222 selects one unmatched disk slot from the disk definition table 233.

(Step S28) The determination unit 222 compares the attribute information (hereinafter, referred to as the "attribute information defined in the unmatched disk slot") correspondingly registered in the unmatched disk slot selected from the disk definition table 233 with the attribute information correspondingly registered in the other unmatched disk slots except the disk slot selected at step S27 in the disk mount table 234. The determination unit 222 then extracts a combination of the unmatched disk slots the above attribute information units of which are matched with each other. Note that, in this process of step S28, the determination unit 222 excludes the unmatched disk slot which is registered as "MOVE" in the column of the determination result in the disk mount table 234 through the after-mentioned process of step S30 from a comparison object with the selected unmatched disk slot.

(Step S29) When a combination of the unmatched disk slots, both of the attribute information units of which are matched through the comparison process of step S28, is extracted (Yes at step S29), the determination unit 222 performs a process of step S30. On the other hand, when a combination of the unmatched disk slot, both of the attribute information units of which are matched with each other, is not extracted (No at step S29), the determination unit 222 registers the unmatched disk slot as "ERROR" in the column of the determination result of the unmatched disk slot selected at step S27 in the disk definition table 233.

(Step S30) When a combination of the unmatched disk slots, both of the attribute information units of which are matched through the comparison process of step S28, is extracted, a disk slot to be mounted on the unmatched disk slot selected at step S27 is mounted on another unmatched disk slot extracted from the disk mount table 234. In this case, in the column of the determination result corresponding to the unmatched disk slot selected at step S27 in the disk definition table 233, the determination unit 222 registers a DE slot number and a disk slot number indicating a position of the other unmatched disk slot extracted from the disk mount table 234 at step S28. At the same time, in the column of the determination result corresponding to another unmatched disk slot in the disk definition table 233, the determination unit 222 registers the unmatched disk slot as "MOVE".

The DE slot number and disk slot number registered in the column of the determination result in the disk definition table 233 at step S30 indicate a position on which a disk device to be originally mounted on the disk slot corresponding to the column of the determination result is erroneously mounted currently. Further, the disk slot registered as "MOVE" in the column of the determination result in the disk mount table 234 at step S30 represents that a disk device currently mounted on the disk slot corresponding to the column of the determination result is to be mounted on another disk slot.

At step S28 as described above, the unmatched disk slot registered as "MOVE" in the column of the determination result in the disk mount table 234 through the process of step S30 is excluded from the comparison object with the selected unmatched disk slot. As a result, the registration process of step S30 is performed so as not to overlap a disk slot number registered in the column of the determination result in the disk definition table 233.

(Step S31) When a process in the loop is performed to all the unmatched disk slots of the DE slots registered as "ERROR", the determination unit 222 performs a process of step S32.

As a result of the above process up to step S31, among the columns of the determination result in the disk definition table 233, any of the "OK", "ERROR", DE slot number and disk slot number are registered in the column of all the determination results corresponding to the disk slots the attribute information of which is registered.

(Step S32) Among the columns of the determination result corresponding to the unmatched disk slot the attribute information of which is registered in the disk mount table 234, the determination unit 222 registers the unmatched disk slot as "ERROR" in the remaining columns in which none of the "OK", DE slot number and disk slot number are registered. The determination unit 222 then notifies the display processing unit 223 that a table registration process is finished.

Here, the foregoing processes of steps S25 to S32 will be described with reference to a specific mounting state of the disk device.

Figure 15:
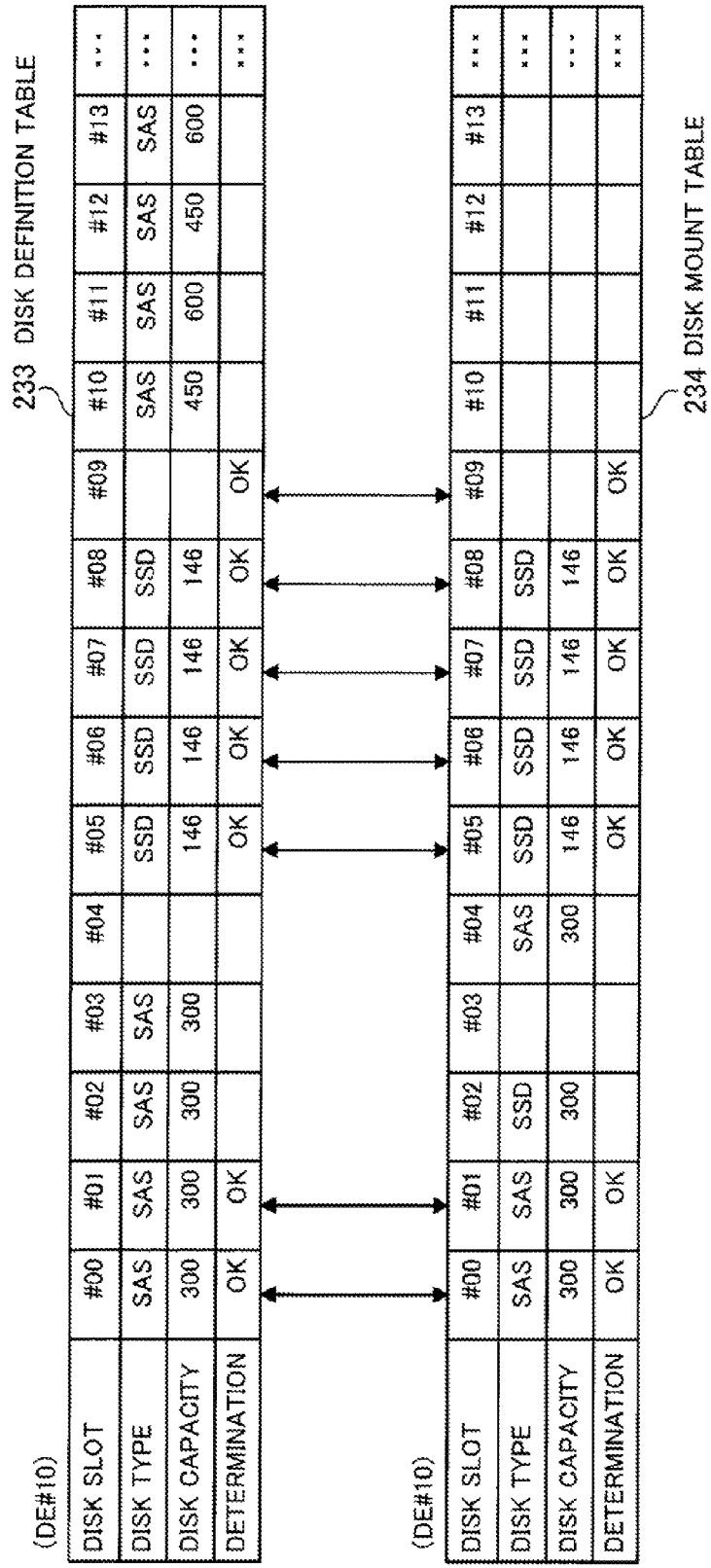
FIG. 15 illustrates a detection example of an unmatched disk slot.

FIG. 15 illustrates a detection example of the unmatched disk slot.

At step S25 of FIG. 11, in each DE slot registered as "ERROR", the determination unit 222 compares both of the attribute information units registered in the column of the same disk slot in the disk definition table 233 and the disk mount table 234. FIG. 15 illustrates an example of the disk definition table 233 and the disk mount table 234 about the DE slot "#10" determined as "ERROR". In this example of FIG. 15, both of the attribute information units between the tables are matched in the disk slots "#00", "#01", and "#05" to "#09". In this case, the determination unit 222 registers the disk slots as "OK" in the columns of the determination result of the disk definition table 233 and the disk mount table 234 about respective disk slots "#00", "#01", and "#05" to "#09".

Here, the disk slots which are not registered as "OK" in the column of the determination result are detected to be unmatched disk slots. Among these unmatched disk slots, unmatched disk slots obtained by excluding those the attribute information of which is not defined are objects of the loop process of steps S26 to S31 in FIG. 11.

FIG. 16 illustrates a detection example of the unmatched disk slot the attribute information units of which are matched with each other. FIG. 16 illustrates an example of the case where the attribute information unit of the disk definition table 233 about the DE slot "#10" and the attribute information unit of the disk mount table 234 about the DE slots "#10" and "#20" are compared.

In the loop process of steps S26 to S31 of FIG. 11, the attribute information units are compared between both the unmatched disk slots. In an example of FIG. 16, information defined in the disk slot "#02" of the DE slot "#10" is matched with the attribute information of the disk device mounted on the disk slot "#04" of the DE slot "#10". In this case, the determination unit 222 registers the disk slot as "10-04" indicating a position of another disk slot the attribute information units of which are matched in the columns of the determination result corresponding to the disk slot "#02" of the DE slot "#10" in the disk definition table 233. The "10-04" indicates a position of the disk slot "#04" in the DE slot "#10". At the same time, the determination unit 222 registers the disk slot as "MOVE" in the column of the determination result corresponding to the "10-04" in the disk mount table 234 (step S30 of FIG. 11).

In an example of FIG. 16, information units defined in the disk slots "#10" to "#13" of the DE slot "#10" are matched with the attribute information units of the disk devices mounted on the disk slots "#10" to "#13" of the DE slot "#20", respectively. In this case, the determination unit 222 registers the disk slots as "20-10", "20-11", "20-12", and "20-13" indicating positions of the disk slots of the DE slot "#20" both of the attribute information units of which are matched in the columns of the determination result corresponding to the disk slots "#10", "#11", "#12", and "#13" of the DE slot "#10" in the disk definition table 233, respectively. At the same time, the determination unit 222 registers the disk slots as "MOVE" in all the columns of the determination results corresponding to the "20-10", "20-11", "20-12", and "20-13" in the disk mount table 234 (step S30 of FIG. 11).

On the other hand, at the time when the disk slot "#03" of the DE slot "#10" is selected at step S27 of FIG. 11, the attribute information units defined in this disk slot are supposed to be not matched with any of the attribute information units registered in the disk slot in which the determination result is blank in the disk mount table 234. In this case, the determination unit 222 registers the disk slot as "ERROR" in the column of the determination result corresponding to the disk slot "#03" of the DE slot "#10" in the disk definition table 233. In this case, with regard to the disk slot "#03" of the DE slot "#10", in a method for freshly mounting a disk device mounted on another disk slot in a rack, it is impossible to correctly mount a disk device on a disk slot. A new disk device which is mounted on this disk slot needs to be prepared.

In the loop process of steps S26 to S31 of FIG. 11, the unmatched disk slot is selected one by one at step S27 and attribute information units thereof are compared with the attribute information units of the other unmatched disk slots. However, suppose, for example, that a plurality of adjacent disk slots are the unmatched disk slots. In this case, a disk device having the attribute information units defined in the plurality of disk slots may be erroneously mounted on the plurality of adjacent disk slots in other positions. In an example of FIG. 16, disk devices to be mounted on the disk slots "#10" to "#13" of the DE slot "#10" are erroneously mounted on the disk slots "#10" to "#13" of the DE slot "#20".

To cope with the problem, in the loop process of steps S26 to S31 of FIG. 11, a group of the plurality of adjacent unmatched disk slots may be detected from the disk definition table 233. Further, a group in which the number of disk slots is large may be preferentially selected and another group the attribute information units of which is matched with the attribute information units defined in the selected group may be extracted from the disk mount table 234. Through the above steps, a disk device a mounting position of which is changed is determined in units of group and work efficiency for changing a mounting position of the disk device is improved.

FIG. 17 illustrates a detection example of the unmatched disk slot registered as "ERROR".

At step S32 of FIG. 11, among the columns of the determination results corresponding to the unmatched disk slots the attribute information units of which are registered in the disk mount table 234, the determination unit 222 registers the disk slot as "ERROR" in the remaining columns in which none of the "OK" and the DE slot number and disk slot number are registered.

Here, at the time when the loop process of steps S26 to S31 of FIG. 11 is finished, the disk definition table 233 and the disk mount table 234 are supposed to be illustrated in FIG. 16. In this case, as illustrated in FIG. 17, in the disk mount table 234, the determination unit 222 registers the disk slot as "ERROR" in the columns of the determination results corresponding to the disk slot "#02" of the DE slot "#10" and the disk slots "#00" to "#02" of the DE slot "#20", respectively. In this case, in the disk slot "#02" of the DE slot "#10" and the disk slots "#00" to "#02" of the DE slot "#20", unnecessary disk devices are mounted and the above disk devices need to be removed.

Figure 18:
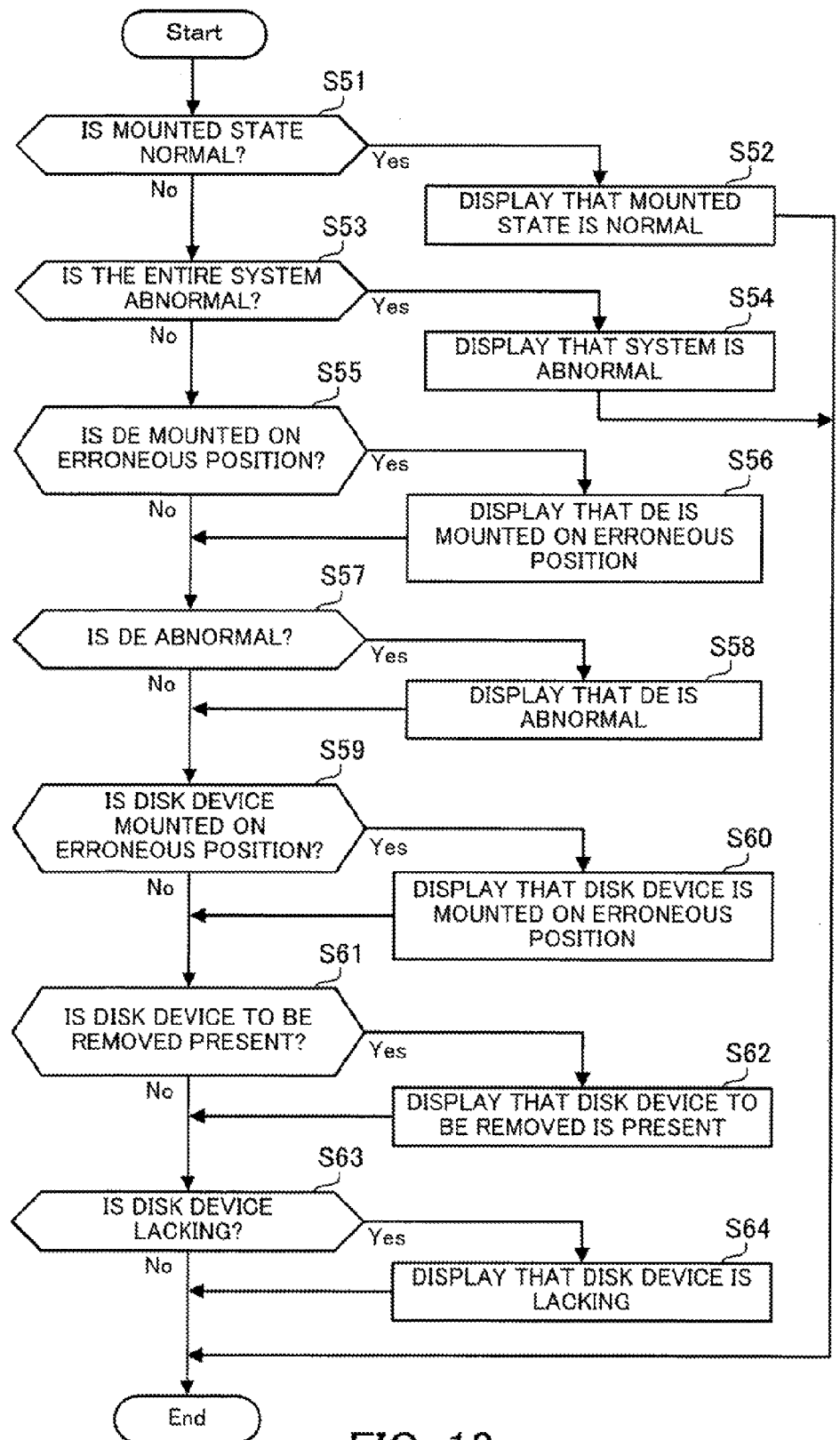
FIG. 18 is a flowchart illustrating an example of a processing procedure of a display processing unit.

Next, FIG. 18 is a flowchart illustrating an example of a processing procedure of the display processing unit. This process of FIG. 18 is started when a termination notice of the table registration process is received from the determination unit 222.

(Step S51) Through the process of step S15 of FIG. 10, when notified by the determination unit 222 that a mounted state of the disk device is normal (Yes at step S51), the display processing unit 223 performs the process of step S52. On the other hand, when not notified by the determination unit 222 that a mounted state of the disk device is normal (No at step S51), the display processing unit 223 performs the process of step S53.

(Step S52) The display processing unit 223 generates display information indicating that a mounted state of the disk device is normal, and supplies it to the management terminal 420. Through the process, based on the information displayed on the display device 421 of the management terminal 420, a worker recognizes that a mounted state of the disk device is normal.

(Step S53) Through the process of step S24 of FIG. 11, when notified by the determination unit 222 that the entire system is abnormal (Yes at step S53), the display processing unit 223 performs the process of step S54. On the other hand, when not notified by the determination unit 222 that the entire system is abnormal (No at step S53), the display processing unit 223 performs the process of step S55.

(Step S54) An abnormality of the entire system of which the determination unit 222 notifies the display processing unit 223 (Yes at step S53) indicates that the number of the above-described unmatched DE slots is greater than a predetermined threshold. In this case, as the display information indicating that the entire system is abnormal, for example, the display processing unit 223 generates information in which the unmatched DE slots are list-displayed, and supplies it to the management terminal 420. With reference to the DE table 232, the display processing unit 223 determines as the unmatched DE slot a DE slot which is not registered as "OK", and list-displays the determined unmatched DE slots. A worker who visually confirms the displayed information recognizes that the number of the unmatched DE slots is too many, and suspects an abnormality of the entire system, thus performing verification work.

(Step S55) The display processing unit 223 determines whether a DE is mounted on an erroneous position. In the case where a DE slot number is registered in the column of the determination result of the DE table 232, the display processing unit 223 determines that a DE to be mounted on the DE slot corresponding to the column of the determination result is currently mounted on an erroneous position. If the DE is mounted on an erroneous position (Yes at step S55), the display processing unit 223 performs the process of step S56. On the other hand, if the DE is not mounted on an erroneous position (No at step S55), the display processing unit 223 performs the process of step S57.

(Step S56) The display processing unit 223 generates the display information for notifying the management terminal 420 that the DE is mounted on an erroneous position, and supplies it to the management terminal 420. For example, the display processing unit 223 identifies a DE slot in which a DE slot number is registered in the column of the determination result in the DE table 232, and displays the identified DE slot on a screen as a DE slot in which the DE is mounted on an erroneous position. At the same time, the display processing unit 223 displays a DE slot number registered in the column of the determination result on the screen as a position on which a correct DE to be mounted on the DE slot corresponding to the column of the determination result is mounted.

(Step S57) The display processing unit 223 determines whether a DE is abnormal. The display processing unit 223 refers to the disk definition table 233 about the unmatched DE slot, and counts the number of the "ERROR" units in each DE slot. When the number of the "ERROR" units is greater than a predetermined threshold, the display processing unit 223 determines that a DE mounted on the DE slot is abnormal. If so (Yes at step S57), the display processing unit 223 performs the process of step S58. If not (No at step S57), the display processing unit 223 performs the process of step S59.

(Step S58) The display processing unit 223 generates the display information for notifying the management terminal 420 that the DE is abnormal, and supplies it to the management terminal 420. Based on the disk definition table 233, for example, the display processing unit 223 displays on the screen the DE slot on which the abnormal DE is mounted.

(Step S59) The display processing unit 223 determines whether the disk device is mounted on an erroneous position. When the DE slot number and the disk slot number are registered in the column of the determination result in the disk definition table 233, the display processing unit 223 determines that the disk device to be mounted on the disk slot corresponding to the column of the determination result is currently mounted on an erroneous position. If so (Yes at step S59), the display processing unit 223 performs the process of step S60. If not (No at step S59), the display processing unit 223 performs the process of step S61.

(Step S60) The display processing unit 223 generates the display information for notifying the management terminal 420 that the disk device is mounted on an erroneous position, and supplies it to the management terminal 420. With reference to the disk definition table 233, for example, the display processing unit 223 identifies a disk slot in which the DE slot number and the disk slot number are registered in the column of the determination result, and displays the identified disk slot on the screen as a disk slot in which the disk device is mounted on an erroneous position. At the same time, the display processing unit 223 displays the DE slot number and disk slot number registered in the column of the determination result on the screen as a position on which the disk device to be mounted on the disk slot corresponding to the column of the determination result is currently mounted.

(Step S61) The display processing unit 223 determines whether a disk device (unnecessary disk device) is to be removed. When a disk slot is registered as "ERROR" in the column of the determination result in the disk mount table 234, the display processing unit 223 determines that an unnecessary disk device to be removed is mounted on the disk slot corresponding to the column of the determination result. If so (Yes at step S61), the display processing unit 223 performs the process of step S62. If not (No at step S61), the display processing unit 223 performs the process of step S63.

(Step S62) The display processing unit 223 generates the display information for notifying the management terminal 420 that the disk device is to be removed, and supplies it to the management terminal 420. With reference to the disk mount table 234, for example, the display processing unit 223 identifies a disk slot which is registered as "ERROR" in the column of the determination result, and displays a position of the identified disk slot on the screen.

(Step S63) The display processing unit 223 determines whether a disk device is lacking. When a disk slot is registered as "ERROR" in the column of the determination result in the disk definition table 233, the display processing unit 223 determines that a disk device to be mounted on the disk slot corresponding to the column of the determination result is lacking. If so (Yes at step S63), the display processing unit 223 performs the process of step S64. If not (No at step S63), the display processing unit 223 ends the process.

(Step S64) The display processing unit 223 generates the display information for notifying the management terminal 420 that a disk device is lacking, and supplies it to the management terminal 420. With reference to the disk definition table 233, for example, the display processing unit 223 identifies a disk slot which is registered as "ERROR" in the column of the determination result, and displays a position of the identified disk slot on the screen.

Suppose, for example, that a disk device is not currently mounted on the identified disk slot (that is, suppose that attribute information is not registered in the column of the disk mount table 234 corresponding to the identified disk slot). In this case, on the screen, the display processing unit 223 displays that a disk device is not yet mounted, or a disk device is erroneously recognized.

In the above-described processes, a process order of each determination process of steps S55, S57, S59, S61, and S63 may be arbitrarily changed.

Next, there are illustrated examples of screens displayed through the process of the display processing unit 223.

Figure 19:
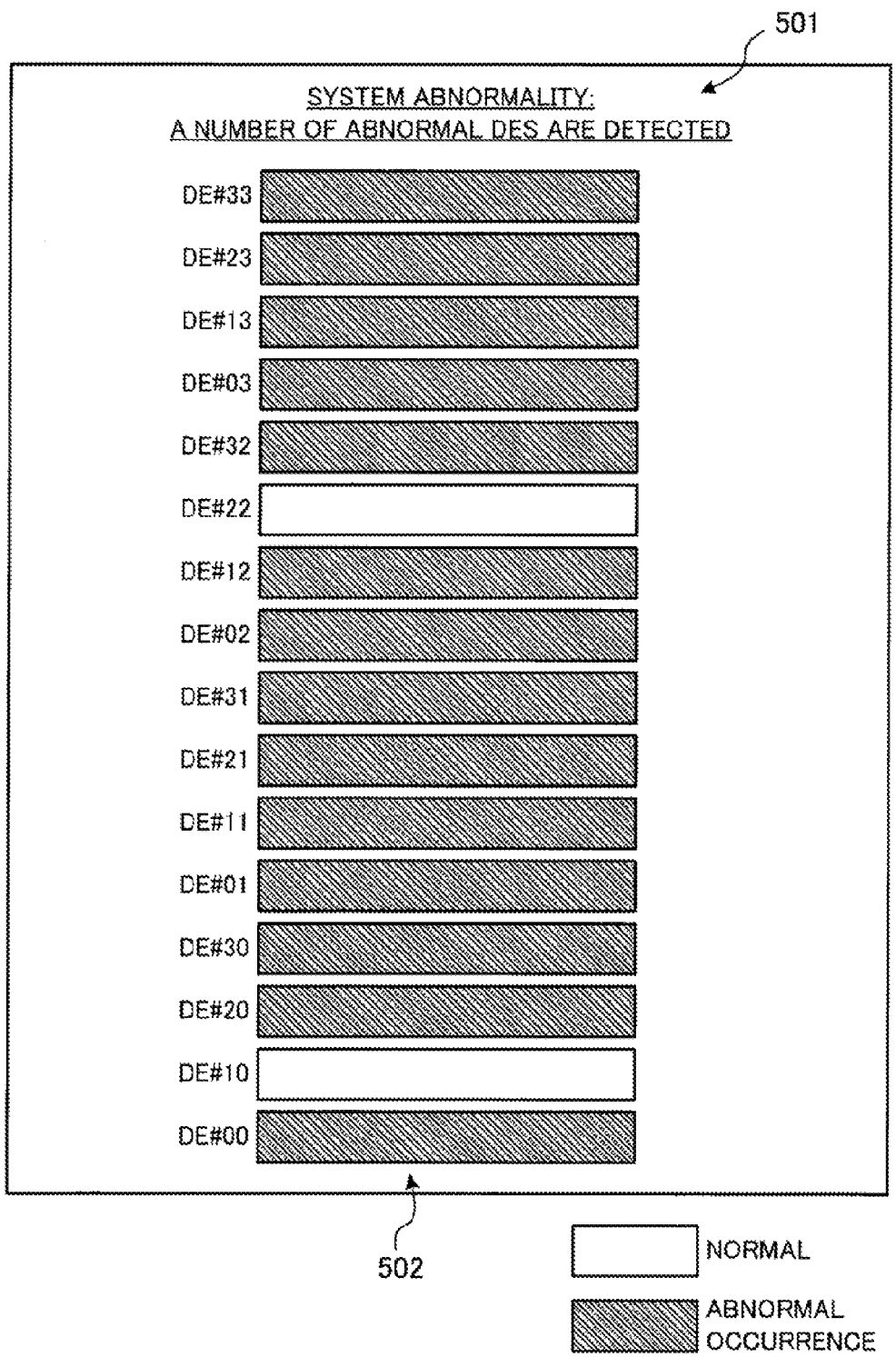
FIG. 19 illustrates an example of a display screen indicating that the entire system is abnormal.

FIG. 19 illustrates an example of a display screen indicating that the entire system is abnormal. When the number of the unmatched DE slots is greater than a predetermined threshold, the display processing unit 223 displays on the screen that the entire system is abnormal (step S54 of FIG. 18). On the display screen of this case, for example, as illustrated in FIG. 19, there is displayed a message display unit 501 which notifies, through character information, a worker that the entire system is abnormal. In addition, on this display screen, the state display units 502 corresponding to the DE slot number are arranged according to an arrangement order of the DE slots on the rack. According to whether the corresponding DE slot is normal, the state display unit 502 changes colors and patterns and displays them through different display states. Through the process, in an easily understood manner, a worker recognizes that there are generated a number of the unmatched DE slots in which a configuration of the mounted disk device is not matched with the defined configuration.

As described above, when determining that the number of the unmatched DE slots is greater than a threshold and the entire system is abnormal, comparison process of the attribute information is not performed in units of the disk device of step S25 or later of FIG. 11 and a screen as in FIG. 19 is displayed. Accordingly, at short times, the storage system 100 notifies a worker that the entire system is abnormal.

Figure 20:
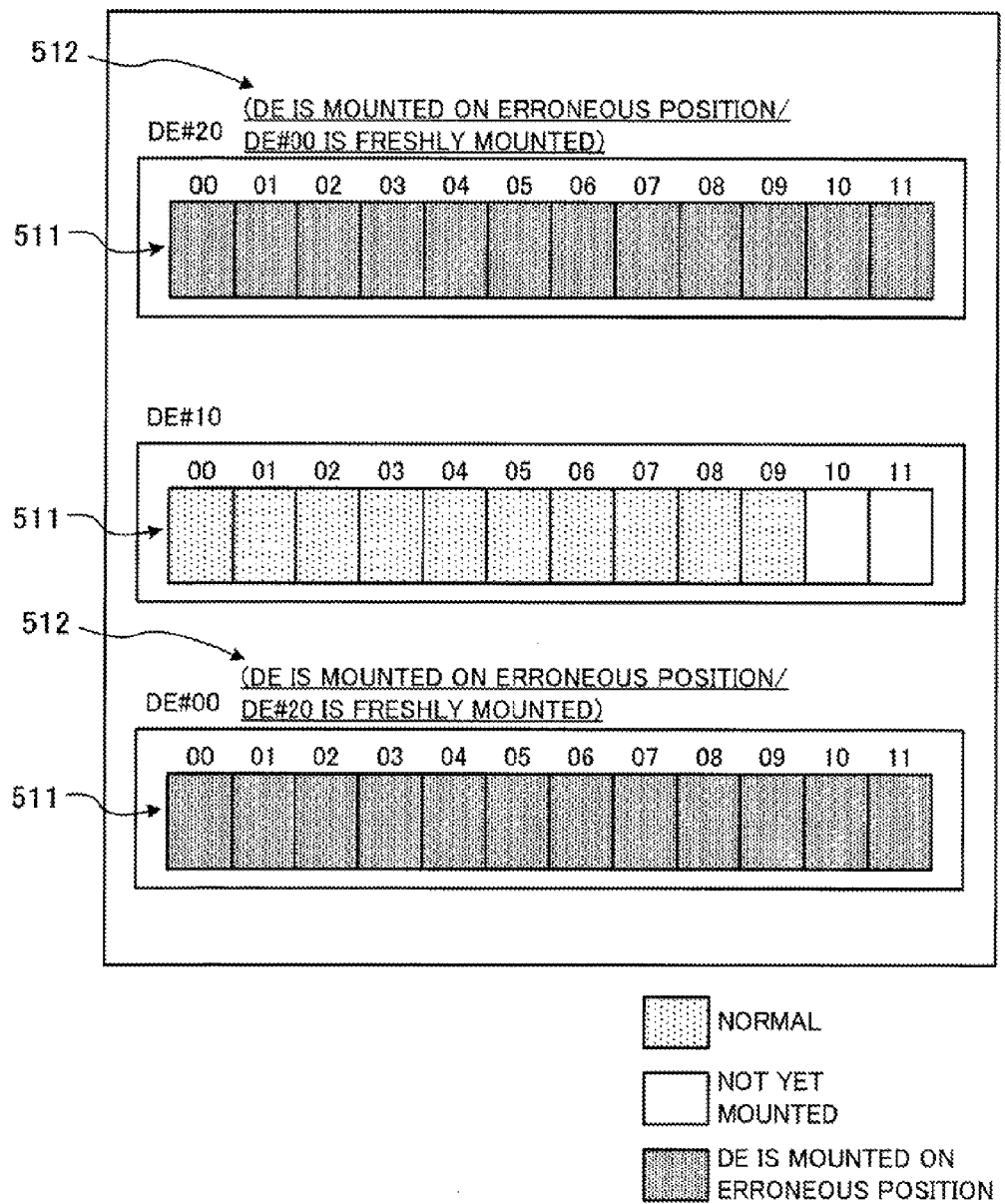
FIG. 20 illustrates an example of a display screen for notifying a worker that a DE is mounted on an erroneous position.

FIG. 20 illustrates an example of a display screen for notifying a worker that a DE is mounted on an erroneous position.

At steps S56, S58, S60, S62, and S64 of FIG. 18, for example, a disk state display screen for list-displaying a state of each disk slot in the DE slot is displayed. On a disk state display screen, the disk state display unit 511 is displayed in each DE slot. In the disk state display unit 511, a mounted state of the disk device of each disk slot is displayed in the display state different for each mounted state with colors and patterns changed. In an example of FIG. 20, only the disk state display units 511 corresponding to the DE slots "#00", "#10", and "#20" are illustrated. For example, when a screen is scrolled vertically, the disk state display units 511 are displayed with relation to all DE slots.

At step S56 of FIG. 18, the display processing unit 223 identifies a DE slot in which a DE slot number is registered in the column of the determination result of the DE table 232. The display processing unit 223 changes a display state of the disk state display unit 511 corresponding to the identified DE slot into a state of indicating that a DE is mounted on an erroneous position. In addition, the display processing unit 223 displays a warning display image 512 correspondingly to the disk state display unit 511 corresponding to the DE slot in which a DE is mounted on an erroneous position. On this warning display image 512, information on a position on which the disk device to be mounted on the corresponding DE slot is currently mounted is displayed.

In an example of FIG. 20, "#20" and "#00" as a DE slot number are supposed to be registered in the column of the determination result corresponding to the DE slots "#00" and "#20" in the DE table 232, respectively. In this case, the display processing unit 223 changes a display state of the disk state display unit 511 each corresponding to the DE slots "#00" and "#20" into a state of indicating that a DE is mounted on an erroneous position. At the same time, the display processing unit 223 displays "#20" and "#00" as a DE slot number on the warning display image 512 each corresponding to the DE slots "#00" and "#20", respectively.

Through the above-described display screen, a worker recognizes that DEs which are currently mounted on the DE slots "#20" and "#00" are preferably moved to the DE slots "#00" and "#20", respectively. Since an error of the mounting position or a position of the move destination is recognized not in units of disk slots but in units of DE slots, a worker improves work efficiency. A DE slot in which a DE is mounted on an erroneous position is restored to a correct state by using an existing DE mounted on another DE slot. Therefore, a worker recognizes that procurement of new DE or disk device is unnecessary.

Figure 21:
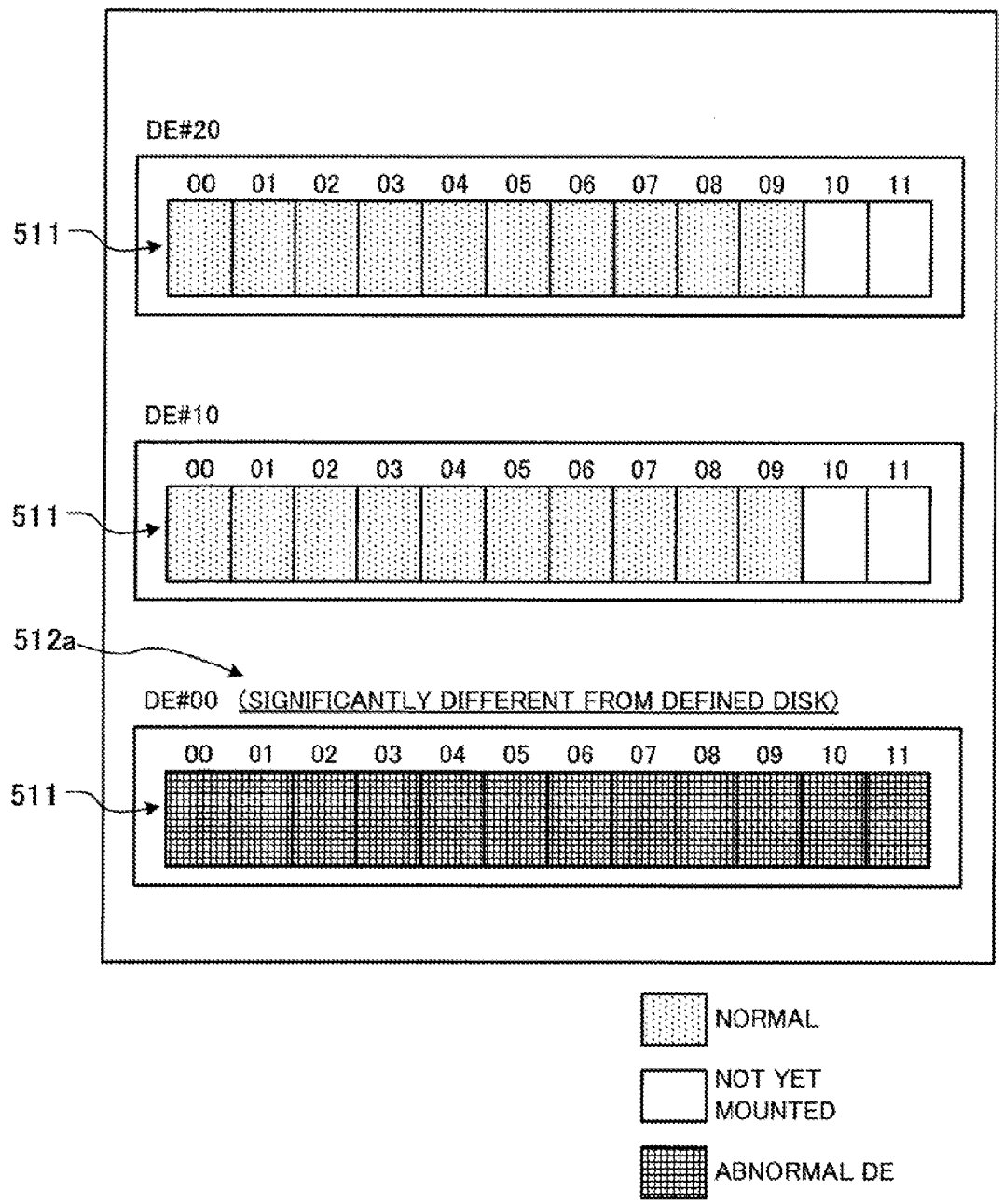
FIG. 21 illustrates an example of a display screen for notifying a worker that a DE is abnormal.

FIG. 21 illustrates an example of a display screen for notifying a worker that a DE is abnormal.

At step S58 of FIG. 18, the display processing unit 223 identifies a position of an abnormal DE in which the number of the disk slots which are registered as "ERROR" in the disk definition table 233 is greater than a predetermined threshold. The display processing unit 223 changes a display state of the disk state display unit 511 corresponding to the identified abnormal DE into a state of indicating that a DE is abnormal. In an example of FIG. 21, the disk state display unit 511 corresponding to the DE slot "#00" displays a state of indicating that a DE is abnormal. Correspondingly to the disk state display unit 511 corresponding to the abnormal DE, the display processing unit 223 allows the management terminal 420 to display the warning display image 512a indicating, through character information, that the DE is abnormal.

Through the above-described display screen, a worker easily recognizes the DE slot in which the number of the disk slots which are registered as "ERROR" is too many. Accordingly, through the above-described display screen, there is supported work for identifying a cause of occurrence of abnormality such as an erroneous arrangement of the disk devices in the recognized DE slot.

Figure 22:
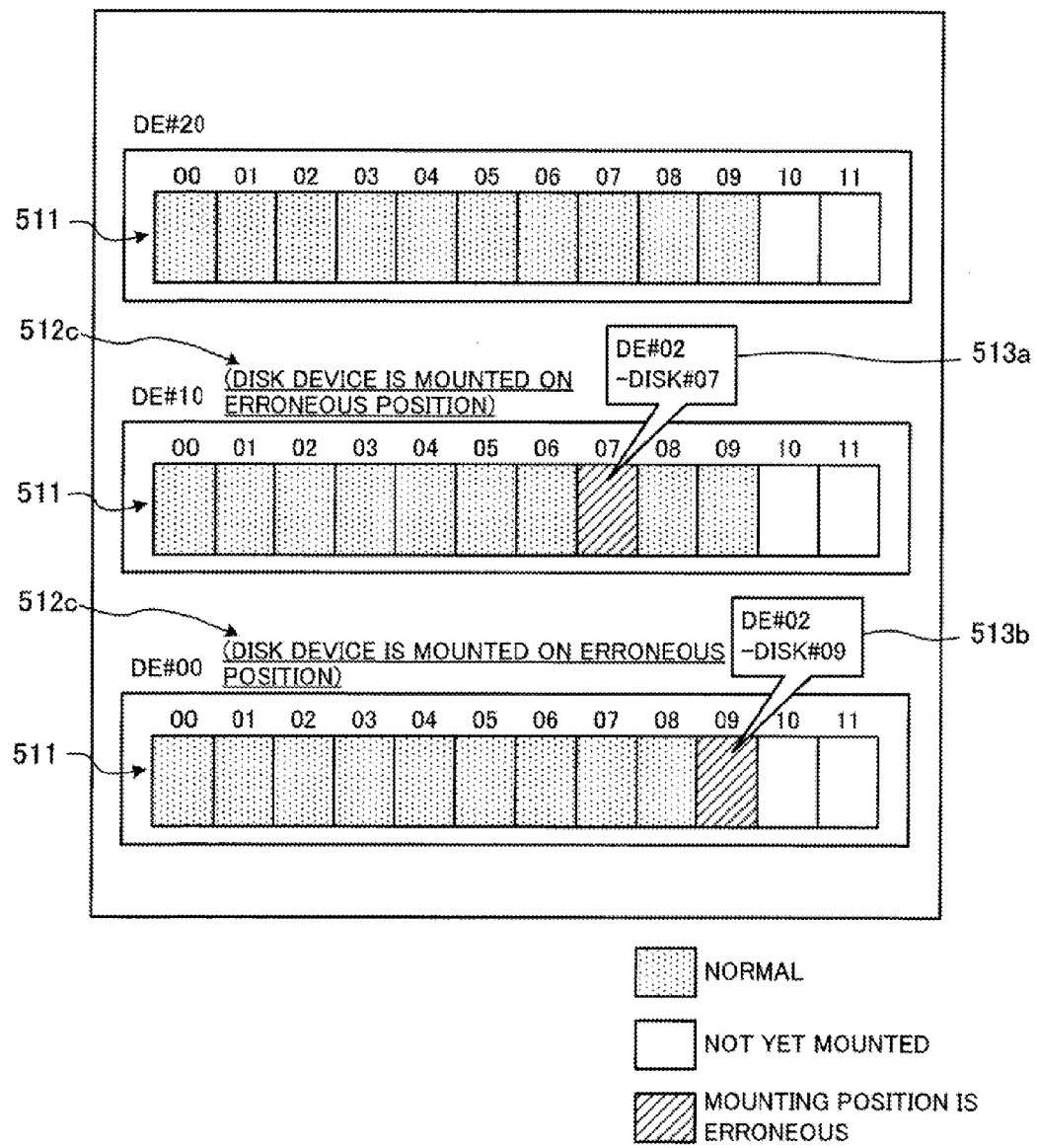
FIG. 22 illustrates an example of a display screen for notifying a worker that a disk device is mounted on an erroneous position.

FIG. 22 illustrates an example of a display screen for notifying a worker that a disk device is mounted on an erroneous position.

At step S60 of FIG. 18, the display processing unit 223 identifies the disk slot in which a DE slot number and a disk slot number are registered in the column of the determination result in the disk definition table 233. The display processing unit 223 changes a display state of the disk state display unit 511 corresponding to the identified disk slot into a display state of indicating that a disk device is mounted on an erroneous position. At the same time, correspondingly to the DE slot including a disk slot in which a disk device is mounted on an erroneous position, the display processing unit 223 allows the management terminal 420 to display the warning display image 512c indicating, through character information, that the disk device is mounted on an erroneous position.

Correspondingly to the disk slot in which the disk device is mounted on an erroneous position, the display processing unit 223 further displays a position display image indicating positions of the DE slot and disk slot on which a disk device to be mounted on the disk slot is currently mounted. In the disk definition table 233, on the position display image, a DE slot number and a disk slot number which are registered in the column of the determination result of the disk slot corresponding to the position display image are displayed.

In an example of FIG. 22, in the disk slot "#09" of the DE slot "#00" and the disk slot "#07" of the DE slot "#10", it is displayed that a disk device is mounted on an erroneous position. Correspondingly to the disk slot "#07" of the DE slot "#10" and the disk slot "#09" of the DE slot "#00", the position display images 513a and 513b are displayed, respectively.

Based on the position display image 513a, a worker recognizes that it is preferred that a disk device mounted on the disk slot "#07" of the DE slot "#02" is freshly mounted on the disk slot "#07" of the DE slot "#10". Further, based on the position display image 513b, the worker recognizes that it is preferred that a disk device mounted on the disk slot "#09" of the DE slot "#02" is freshly mounted on the disk slot "#09" of the DE slot "#00". The above process permits work efficiency to be improved. A disk slot in which a disk device is mounted on an erroneous position is restored to a correct state by using an existing disk device mounted on another disk slot. Therefore, the worker recognizes that procurement of a new disk device is unnecessary.

Figure 23:
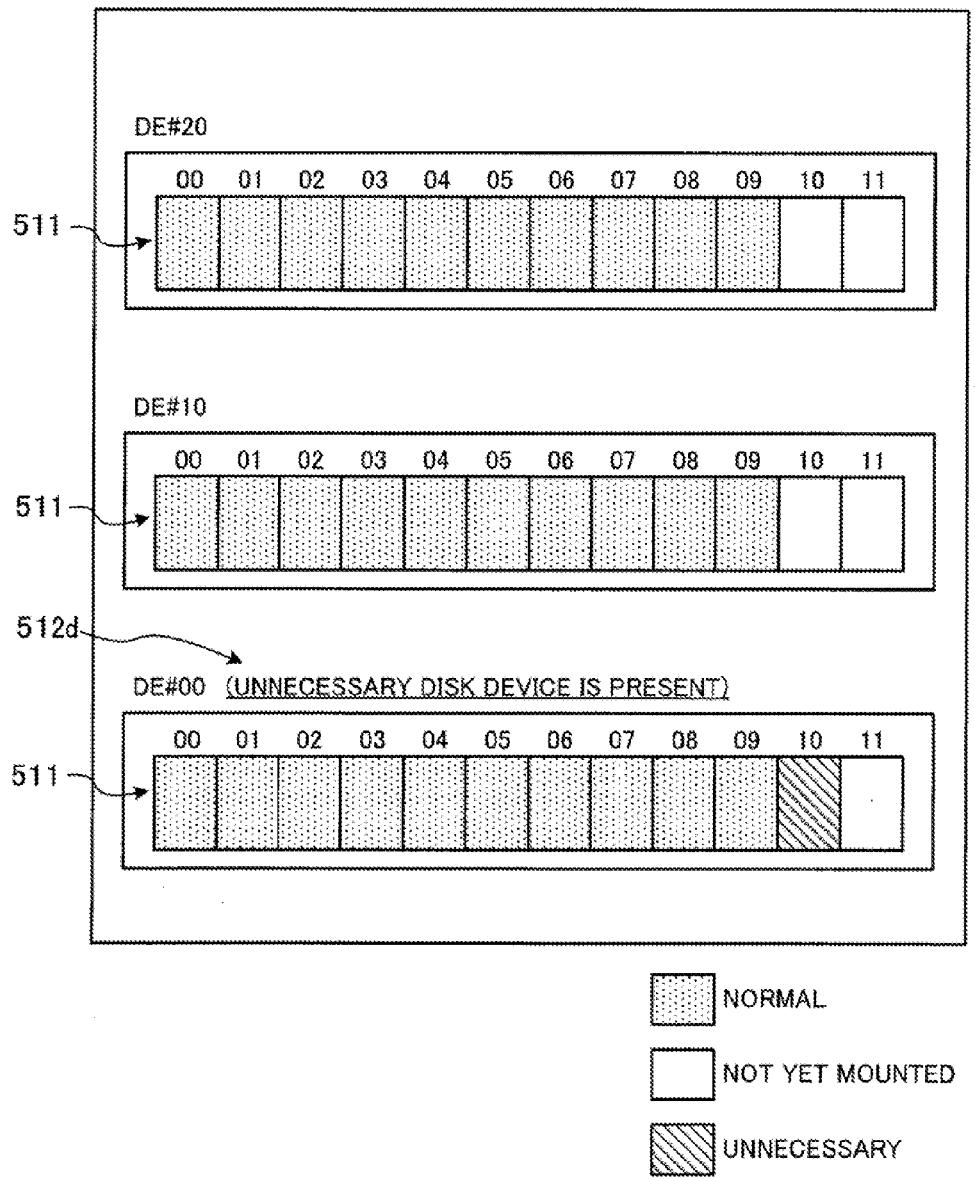
FIG. 23 illustrates an example of a display screen for notifying a worker that a disk device is to be removed.

FIG. 23 illustrates an example of a display screen for notifying a worker that a disk device is to be removed.

At step S62 of FIG. 18, the display processing unit 223 identifies a disk slot which is registered as "ERROR" in the column of the determination result in the disk mount table 234. The display processing unit 223 changes a display state of the disk state display unit 511 corresponding to the identified disk slot into a display state of indicating that an unnecessary disk device to be removed from a rack is mounted. In an example of FIG. 23, a state of indicating that an unnecessary disk device is mounted is displayed on an area of the disk slot "#10" in the disk state display unit 511 corresponding to the DE slot "#00". Correspondingly to the disk state display unit 511 of the DE slot on which an unnecessary disk device is mounted, the display processing unit 223 displays the warning display image 512d indicating, through character information, that an unnecessary disk device is mounted.

Through the above-described display screen, a worker recognizes a disk slot on which an unnecessary disk device to be removed from a rack is mounted. The above process permits work efficiency to be improved. Further, from a disk slot on which an unnecessary disk device is mounted, the disk device is simply removed, thereby restoring a DE mounted state to a correct state. Therefore, the worker recognizes that procurement of a new disk device is unnecessary.

Figure 24:
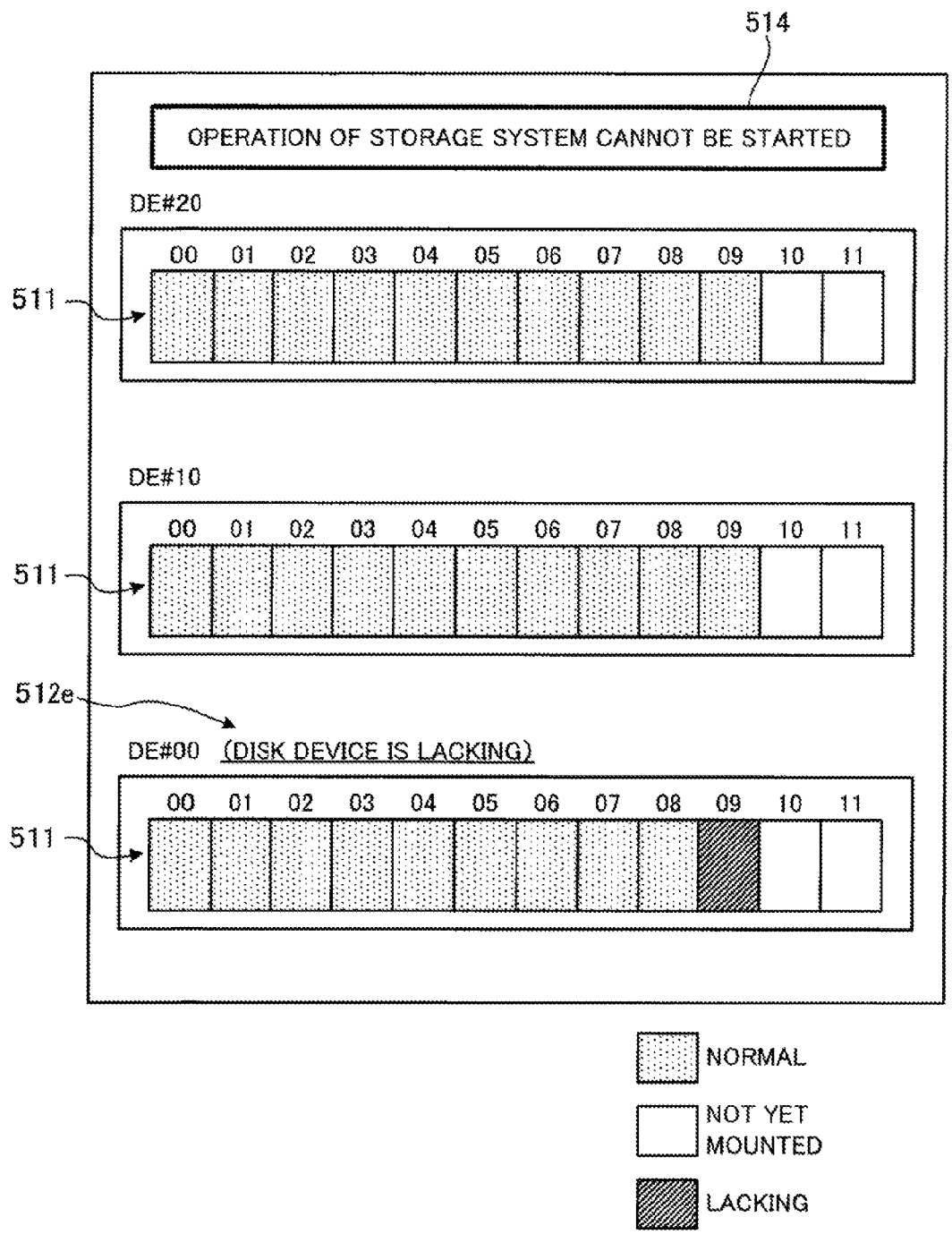
FIG. 24 illustrates an example of a display screen for notifying a worker that a disk device is lacking.

FIG. 24 illustrates an example of a display screen for notifying a worker that a disk device is lacking.

At step S64 of FIG. 18, the display processing unit 223 identifies a disk slot which is registered as "ERROR" in the column of the determination result in the disk definition table 233. The display processing unit 223 changes a display state of the disk state display unit 511 corresponding to the identified disk slot into a display state of indicating that a disk device to be mounted is lacking. In an example of FIG. 24, a state of indicating that a disk device is lacking is displayed on an area of the disk slot "#09" in the disk state display unit 511 corresponding to the DE slot "#00". Correspondingly to the disk state display unit 511 of the DE slot including a disk slot in which a disk device is lacking, the display processing unit 223 displays the warning display image 512e indicating, through character information, that a disk device is lacking. Through the above-described display screen, a worker recognizes a disk slot in which a mounted state is incapable of being restored by simply moving a mounting position of the disk device currently mounted on a rack.

In the case where the disk device is lacking, until a lacking disk device is procured, an operation of the storage system 100 fails to be started as in initial setting. To cope with the problem, for example, the display processing unit 223 displays a warning display image 514 indicating that an operation of the storage system 100 fails to be started as in the initial setting. Through the process, a worker easily recognizes that an operation of the storage system 100 fails to be started as in the initial setting. For example, when the number of the unmatched DE slots is greater than a threshold, or when a DE in which the number of the unmatched disk slots is greater than a threshold is abnormal, the same warning display image 514 may be displayed.

According to the above-described storage system 100, a worker easily recognizes a position of a disk slot on which a correct disk device matched with the attribute information defined in the configuration definition information 231 is not mounted. When a mounting position of the disk device is moved to be restored, the storage system 100 may notify a worker that which disk device is preferably moved to which disk slot. Particularly, the above notification of a move destination position is performed not only in units of disk slots but also in units of DE slots. Further, the present embodiment determines whether an operation of the storage system 100 is started by using a disk device currently mounted on a rack without procuring a new disk device, and notifies the worker of the above effect.

Accordingly, even when the number of disk devices mounted on the storage system 100 increases, work efficiency for confirming a mounted state of a disk device is improved and time necessary for confirmation work or subsequent replacement work of disk devices is shortened. When work for confirming a mounted state of the disk device is made to be efficient, work for mounting a disk device or a DE on a rack is capable of being definitely performed at short times in an installation place of the storage system 100. Particularly, it is determined whether a DE mounted state is restored by moving which DE to which DE slot. Through the process, in the case where a DE is shipped with a disk device mounted, efficiency and correctness of DE mounting work onto a rack are improved.

According to one embodiment, efficiency of confirmation work in a mounting position of an electronic device is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A management system comprising:
a plurality of electronic devices; and
a management apparatus which manages the plurality of electronic devices, wherein the management apparatus includes:
a collection unit which collects attribute information of each of the plurality of electronic devices, and registers the collected attribute information in first device information correspondingly to a mounting position of said each electronic device of the management system; and
a determination unit which refers to second device information in which attribute information of each electronic device which is to be mounted on the management system is registered correspondingly to a mounting position, determines as a comparison object position a mounting position in which the attribute information registered in the first device information is not matched with the attribute information registered in the second device information and, when a plurality of comparison object positions are present, the attribute information of the first device information corresponding to a first comparison object position is matched with the attribute information of the second device information corresponding to a second comparison object position and the attribute information of the second device information corresponding to the second comparison object position is matched with the attribute information of the first device information corresponding to the first comparison object position, outputs display information including a first mounting position and a second mounting position, the first mounting position corresponding to the second comparison object position in which an electric device to be mounted in the first comparison object position is mounted, the second mounting position corresponding to the first comparison object position in which an electric device to be mounted in the second comparison object position is mounted.

2. The management system according to claim 1, wherein:
the plurality of electronic devices are mounted on the management system in units of device groups each including one or more electronic devices; and
from among a plurality of device groups, the determination unit determines an unmatched device group in which the attribute information registered in the first device information is not matched with the attribute information registered in the second device information and, when a plurality of unmatched device groups are present, determines whether the attribute information of the first device information corresponding to one unmatched device group is matched with the attribute information of the second device information corresponding to another unmatched device group.

3. The management system according to claim 2, wherein among the plurality of unmatched device groups, when all of the attribute information of the first device information corresponding to a first unmatched device group are matched with all of the attribute information of the second device information corresponding to a second unmatched device group, the determination unit outputs display information in which positions of the first and second unmatched device groups are associated with each other.

4. The management system according to claim 2, wherein the determination unit:
determines whether a number of unmatched device groups is greater than a predetermined threshold; and
when the number of unmatched device groups is smaller than or equal to the threshold and a plurality of the unmatched device groups are present, performs, using as processing objects the comparison object positions included in the plurality of unmatched device groups, comparison determination processing for determining a mounted condition of electronic devices based on a comparison result between the attribute information of the first device information corresponding to one comparison object position and the attribute information of the second device information corresponding to another comparison object position.

5. The management system according to claim 4, wherein when the number of unmatched device groups is greater than the threshold, the determination unit skips the comparison determination processing.

6. The management system according to claim 1, wherein:
among the plurality of comparison object positions, the determination unit compares the attribute information of the first device information corresponding to a first comparison object position with the attribute information of the second device information corresponding to a second comparison object position, and extracts combinations of the first and second comparison object positions which do not overlap each other; and
among the plurality of comparison object positions, the determination unit determines that an electronic device to be mounted is lacking about a comparison object position in which the attribute information is registered in the second device information and which is not extracted as the second comparison object position included in a combination.

7. The management system according to claim 1, wherein the determination unit:
compares, among the plurality of comparison object positions, the attribute information of the first device information corresponding to the first comparison object position with the attribute information of the second device information corresponding to the second comparison object position, and extracts combinations of the first and second comparison object positions which do not overlap each other; and
determines, among the plurality of comparison object positions, that a mounted electronic device is unnecessary about a comparison object position in which the attribute information is registered in the first device information and which is not extracted as the first comparison object position included in a combination.

8. A management apparatus to manage a plurality of electronic devices, the management apparatus comprising:
a processor configured to perform a procedure including:
collecting attribute information of each of the plurality of electronic devices, and registering the collected attribute information in first device information correspondingly to a mounting position of said each electronic device;
referring to second device information in which attribute information of each electronic device which is mounted on a mounting position is registered for each mounting position of the electronic devices, and determining as a comparison object position a mounting position in which the attribute information registered in the first device information is not matched with the attribute information registered in the second device information; and
when a plurality of comparison object positions are present, the attribute information of the first device information corresponding to a first comparison object position is matched with the attribute information of the second device information corresponding to a second comparison object position and the attribute information of the second device information corresponding to the second comparison object position is matched with the attribute information of the first device information corresponding to the first comparison object position, outputting display information including a first mounting position and a second mounting position, the first mounting position corresponding to the second comparison object position in which an electric device to be mounted in the first comparison object position is mounted, the second mounting position corresponding to the first comparison object position in which an electric device to be mounted in the second comparison object position is mounted.

9. The management apparatus according to claim 8, wherein:
the plurality of electronic devices are mounted in units of device groups each including one or more electronic devices; and
the procedure further includes determining, among a plurality of device groups, an unmatched device group in which the attribute information registered in the first device information is not matched with the attribute information registered in the second device information and determining, when a plurality of unmatched device groups are present, whether the attribute information of the first device information corresponding to one unmatched device group is matched with the attribute information of the second device information corresponding to another unmatched device group.

10. The management apparatus according to claim 9, wherein the procedure further includes outputting display information in which positions of first and second unmatched device groups are associated with each other when, among a plurality of unmatched device groups, all of the attribute information of the first device information corresponding to the first unmatched device group are matched with all of the attribute information of the second device information corresponding to the second unmatched device group.

11. A management method for an electronic device for use in a management apparatus which manages a plurality of electronic devices, the management method comprising:
collecting attribute information of each of the plurality of electronic devices, and registering the collected attribute information in first device information correspondingly to a mounting position of said each electronic device;
referring to second device information in which attribute information of each electronic device which is mounted on a mounting position is registered for each mounting position of the electronic devices, and determining as a comparison object position a mounting position in which the attribute information registered in the first device information is not matched with the attribute information registered in the second device information; and
when a plurality of comparison object positions are present, the attribute information of the first device information corresponding to a first comparison object position is matched with the attribute information of the second device information corresponding to a second comparison object position and the attribute information of the second device information corresponding to the second comparison object position is matched with the attribute information of the first device information corresponding to the first comparison object position, outputting display information including a first mounting position and a second mounting position, the first mounting position corresponding to the second comparison object position in which an electric device to be mounted in the first comparison object position is mounted, the second mounting position corresponding to the first comparison object position in which an electric device to be mounted in the second comparison object position is mounted.

12. The management method for an electronic device according to claim 11, wherein the plurality of electronic devices are mounted in units of device groups each including one or more electronic devices, and
the management method further comprising determining, among a plurality of device groups, an unmatched device group in which the attribute information registered in the first device information is not matched with the attribute information registered in the second device information, and determining, when a plurality of unmatched device groups are present, whether the attribute information of the first device information corresponding to one unmatched device group is matched with the attribute information of the second device information corresponding to another unmatched device group.

13. The management method for an electronic device according to claim 12, further comprising outputting display information in which positions of first and second unmatched device groups are associated with each other when, among a plurality of unmatched device groups, all of the attribute information of the first device information corresponding to the first unmatched device group are matched with all of the attribute information of the second device information corresponding to the second unmatched device group.

14. The management method for an electronic device according to claim 12, further comprising:
determining whether a number of unmatched device groups is greater than a predetermined threshold; and
performing, when the number of unmatched device groups is smaller than or equal to the threshold and a plurality of unmatched device groups are present, comparison determination processing for determining a mounted condition of electronic devices based on a comparison result between the attribute information of the first device information corresponding to one comparison object position and the attribute information of the second device information corresponding to another comparison object position, using as processing objects the comparison object positions included in the plurality of unmatched device groups.

15. The management method for an electronic device according to claim 14, wherein when the number of unmatched device groups is greater than the threshold, the comparison determination processing is skipped.

16. The management method for an electronic device according to claim 11, further comprising:
comparing, among the plurality of comparison object positions, the attribute information of the first device information corresponding to a first comparison object position with the attribute information of the second device information corresponding to a second comparison object position, and extracting combinations of the first and second comparison object positions which do not overlap with each other; and
determining, among the plurality of comparison object positions, that an electronic device to be mounted is lacking about a comparison object position in which the attribute information is registered in the second device information and which is not extracted as the second comparison object position included in a combination.

17. The management method for an electronic device according to claim 11, further comprising:
comparing, among the plurality of comparison object positions, the attribute information of the first device information corresponding to the first comparison object position with the attribute information of the second device information corresponding to the second comparison object position, and extracting combinations of the first and second comparison object positions which do not overlap with each other; and
determining, among the plurality of comparison object positions, that a mounted electronic device is unnecessary about a comparison object position in which the attribute information is registered in the first device information and which is not extracted as the first comparison object position included in a combination.

* * * * *